US008880657B1

(12) United States Patent
Angrish et al.

(10) Patent No.: US 8,880,657 B1
(45) Date of Patent: Nov. 4, 2014

(54) SYSTEM AND METHOD FOR CONFIGURING AND MANAGING VIRTUAL GRIDS

(75) Inventors: Yogesh Angrish, San Francisco, CA (US); Justin M. Kitagawa, Lafayette, CA (US); Martin A. Berryman, Walnut Creek, CA (US); Scott Aker, San Leandro, CA (US)

(73) Assignee: Gogrid, LLC, San Francisco, CA (US)

( * ) Notice: Subject to any disclaimer, the term of this patent is extended or adjusted under 35 U.S.C. 154(b) by 155 days.

(21) Appl. No.: 13/171,430

(22) Filed: Jun. 28, 2011

(51) Int. Cl.
G06F 15/177 (2006.01)

(52) U.S. Cl.
USPC .......... 709/220; 709/203; 709/213; 709/218; 709/224; 370/400; 370/397; 370/252; 370/229; 370/219

(58) Field of Classification Search
USPC ......... 709/203, 213, 218, 220, 224, 229, 238; 370/400, 397, 252, 229, 219
See application file for complete search history.

(56) References Cited

U.S. PATENT DOCUMENTS

| 6,085,238 | A * | 7/2000 | Yuasa et al. ............... 709/223 |
| 6,662,221 | B1 | 12/2003 | Gonda et al. |
| 6,868,444 | B1 | 3/2005 | Kim et al. |
| 6,888,836 | B1 | 5/2005 | Cherkasova |
| 6,912,221 | B1 | 6/2005 | Zadikian et al. |
| 6,985,937 | B1 | 1/2006 | Keshav et al. |
| 7,054,308 | B1 | 5/2006 | Conway |
| 7,080,378 | B1 | 7/2006 | Noland et al. |
| 7,158,972 | B2 | 1/2007 | Marsland |
| 7,257,811 | B2 | 8/2007 | Hunt et al. |
| 7,321,893 | B1 | 1/2008 | Rambacher et al. |
| 7,370,013 | B1 | 5/2008 | Aziz et al. |
| 7,383,327 | B1 | 6/2008 | Tormasov et al. |
| 7,392,403 | B1 | 6/2008 | Munetoh |
| 7,398,471 | B1 | 7/2008 | Rambacher et al. |
| 7,512,815 | B1 | 3/2009 | Munetoh |
| 7,519,696 | B2 | 4/2009 | Blumenau et al. |
| 7,577,722 | B1 | 8/2009 | Khandekar et al. |
| 7,587,492 | B2 | 9/2009 | Dyck et al. |
| 7,649,851 | B2 | 1/2010 | Takashige et al. |
| 7,694,082 | B2 | 4/2010 | Golding et al. |
| 7,702,843 | B1 | 4/2010 | Chen et al. |
| 7,716,446 | B1 | 5/2010 | Chen et al. |
| 7,730,486 | B2 | 6/2010 | Herington |
| 7,743,107 | B2 | 6/2010 | Kovacs et al. |
| 7,783,856 | B2 | 8/2010 | Hashimoto et al. |
| 7,802,000 | B1 | 9/2010 | Huang et al. |
| 7,802,251 | B2 | 9/2010 | Kitamura |

(Continued)

OTHER PUBLICATIONS

U.S. Appl. No. 12/652,730, filed Jan. 5, 2010, Lappas, Paul, et al.

(Continued)

Primary Examiner — Hitesh Patel
(74) Attorney, Agent, or Firm — Adeli LLP

(57) ABSTRACT

Some embodiments provide a hosting system for provisioning and managing servers (e.g., virtual servers, dedicated servers). In some embodiments, the hosting system receives a configuration for one or more servers for a particular entity (e.g., customer, user). The hosting system then identifies a grid identity and a set of virtual local area network (VLAN) identities for the particular entity. The hosting system then deploys the set of servers on one or more of the hardware nodes using the grid identity and the set of VLAN identities. In some embodiments, the set of VLAN identities includes a first VLAN identity for a private network and a second VLAN identity for a public network.

15 Claims, 24 Drawing Sheets

(56) References Cited

U.S. PATENT DOCUMENTS

| | | |
|---|---|---|
| 7,814,495 B1 | 10/2010 | Lim et al. |
| 7,827,294 B2 | 11/2010 | Merkow et al. |
| 7,843,821 B2 | 11/2010 | Kunhappan et al. |
| 7,856,549 B2 | 12/2010 | Wheeler |
| 7,865,893 B1 | 1/2011 | Omelyanchuk et al. |
| 7,912,955 B1 | 3/2011 | Machiraju et al. |
| 7,925,850 B1 | 4/2011 | Waldspurger et al. |
| 7,941,470 B2 | 5/2011 | Le et al. |
| 7,970,917 B2 | 6/2011 | Nakano et al. |
| 7,987,289 B2 | 7/2011 | Mason et al. |
| 8,001,247 B2 | 8/2011 | Salevan et al. |
| 8,006,079 B2 | 8/2011 | Goodson et al. |
| 8,009,682 B2 | 8/2011 | Gopinath et al. |
| 8,032,635 B2 | 10/2011 | Moore |
| 8,032,899 B2 | 10/2011 | Archer et al. |
| 8,037,280 B2 | 10/2011 | Pandey et al. |
| 8,046,694 B1 | 10/2011 | Lappas et al. |
| 8,095,662 B1 | 1/2012 | Lappas et al. |
| 8,095,931 B1 | 1/2012 | Chen et al. |
| 8,102,781 B2 * | 1/2012 | Smith ............ 370/252 |
| 8,117,495 B2 | 2/2012 | Graham et al. |
| 8,171,115 B2 | 5/2012 | Hamilton et al. |
| 8,171,485 B2 | 5/2012 | Muller |
| 8,184,631 B2 | 5/2012 | Kunhappan et al. |
| 8,195,866 B2 | 6/2012 | Ginzton |
| 8,219,653 B1 | 7/2012 | Keagy et al. |
| 8,280,790 B2 | 10/2012 | Lappas et al. |
| 8,352,608 B1 | 1/2013 | Keagy et al. |
| 8,364,802 B1 | 1/2013 | Keagy et al. |
| 8,374,929 B1 | 2/2013 | Lappas et al. |
| 2004/0054793 A1 | 3/2004 | Coleman |
| 2004/0267897 A1 | 12/2004 | Hill et al. |
| 2005/0038834 A1 | 2/2005 | Souder et al. |
| 2005/0120160 A1 | 6/2005 | Plouffe et al. |
| 2006/0089995 A1 | 4/2006 | Kerr et al. |
| 2006/0136761 A1 | 6/2006 | Frasier et al. |
| 2006/0168224 A1 | 7/2006 | Midgley |
| 2006/0174087 A1 | 8/2006 | Hashimoto et al. |
| 2006/0184653 A1 | 8/2006 | van Riel |
| 2006/0195715 A1 | 8/2006 | Herington |
| 2006/0245439 A1 * | 11/2006 | Sajassi ............ 370/400 |
| 2006/0277542 A1 | 12/2006 | Wipfel |
| 2007/0028239 A1 | 2/2007 | Dyck et al. |
| 2007/0043860 A1 | 2/2007 | Pabari |
| 2007/0050763 A1 | 3/2007 | Kagan et al. |
| 2007/0101334 A1 | 5/2007 | Atyam et al. |
| 2007/0115913 A1 * | 5/2007 | Li et al. ............ 370/349 |
| 2007/0174429 A1 | 7/2007 | Mazzaferri et al. |
| 2007/0233838 A1 | 10/2007 | Takamoto et al. |
| 2007/0234302 A1 | 10/2007 | Suzuki et al. |
| 2007/0240160 A1 | 10/2007 | Paterson-Jones et al. |
| 2007/0250608 A1 | 10/2007 | Watt |
| 2007/0260721 A1 | 11/2007 | Bose et al. |
| 2007/0266433 A1 | 11/2007 | Moore |
| 2007/0283348 A1 | 12/2007 | White |
| 2007/0297428 A1 | 12/2007 | Bose et al. |
| 2008/0049786 A1 | 2/2008 | Ram et al. |
| 2008/0059556 A1 | 3/2008 | Greenspan et al. |
| 2008/0065854 A1 | 3/2008 | Schoenberg et al. |
| 2008/0086726 A1 | 4/2008 | Griffith et al. |
| 2008/0104608 A1 | 5/2008 | Hyser et al. |
| 2008/0148300 A1 | 6/2008 | Archer et al. |
| 2008/0201414 A1 | 8/2008 | Amir Husain et al. |
| 2008/0244600 A1 | 10/2008 | Wong et al. |
| 2009/0049453 A1 | 2/2009 | Baran et al. |
| 2009/0063750 A1 | 3/2009 | Dow |
| 2009/0172662 A1 | 7/2009 | Liu |
| 2009/0182605 A1 * | 7/2009 | Lappas et al. ............ 705/8 |
| 2009/0228883 A1 | 9/2009 | Gebhart et al. |
| 2009/0279552 A1 * | 11/2009 | Dong ............ 370/395.53 |
| 2009/0282406 A1 | 11/2009 | Malki et al. |
| 2009/0300210 A1 | 12/2009 | Ferris |
| 2009/0300660 A1 | 12/2009 | Solomon et al. |
| 2010/0011178 A1 | 1/2010 | Feathergill |
| 2010/0046546 A1 | 2/2010 | Ram et al. |
| 2010/0070970 A1 | 3/2010 | Hu et al. |
| 2010/0070978 A1 | 3/2010 | Chawla et al. |
| 2010/0082799 A1 | 4/2010 | DeHaan et al. |
| 2010/0128432 A1 | 5/2010 | Miller |
| 2010/0138828 A1 | 6/2010 | Hanquez et al. |
| 2010/0235831 A1 | 9/2010 | Dittmer |
| 2010/0325273 A1 * | 12/2010 | Kudo ............ 709/224 |
| 2010/0328849 A1 | 12/2010 | Ewing et al. |
| 2010/0332658 A1 | 12/2010 | Elyashev |
| 2011/0004676 A1 | 1/2011 | Kawato |
| 2011/0055714 A1 | 3/2011 | Vemulapalli et al. |
| 2011/0099267 A1 | 4/2011 | Suri et al. |
| 2011/0106949 A1 | 5/2011 | Patel et al. |
| 2011/0107406 A1 | 5/2011 | Frost et al. |
| 2011/0148895 A1 | 6/2011 | Burckart et al. |
| 2011/0153697 A1 | 6/2011 | Nickolov et al. |

OTHER PUBLICATIONS

U.S. Appl. No. 13/225,372, filed Sep. 2, 2011, Lappas, Paul, et al.
U.S. Appl. No. 11/834,768, filed Aug. 7, 2007, Lappas, Paul, et al.
U.S. Appl. No. 11/834,722, filed Aug. 7, 2007, Lappas, Paul, et al.
U.S. Appl. No. 11/834,726, filed Aug. 7, 2007, Lappas, Paul, et al.
U.S. Appl. No. 12/982,487, filed Dec. 30, 2010, Lappas, Paul, et al.
U.S. Appl. No. 11/834,732, filed Aug. 7, 2007, Lappas, Paul, et al.
U.S. Appl. No. 12/185,774, filed Aug. 4, 2008, Lappas, Paul, et al.
U.S. Appl. No. 13/316,431, filed Dec. 9, 2011, Lappas, Paul, et al.
U.S. Appl. No. 12/421,597, filed Apr. 9, 2009, Keagy, John Martin, et al.
U.S. Appl. No. 12/421,598, filed Apr. 9, 2009, Keagy, John Martin, et al.
U.S. Appl. No. 12/421,599, filed Apr. 9, 2009, Keagy, John Martin, et al.
U.S. Appl. No. 12/421,602, filed Apr. 9, 2009, Keagy, John Martin, et al.
U.S. Appl. No. 12/421,604, filed Apr. 9, 2009, Keagy, John Martin, et al.
U.S. Appl. No. 12/421,605, filed Apr. 9, 2009, Keagy, John Martin, et al.
U.S. Appl. No. 12/421,608, filed Apr. 9, 2009, Keagy, John Martin, et al.
U.S. Appl. No. 12/421,610, filed Apr. 9, 2009, Keagy, John Martin, et al.
U.S. Appl. No. 12/421,611, filed Apr. 9, 2009, Keagy, John Martin, et al.
U.S. Appl. No. 12/421,612, filed Apr. 9, 2009, Keagy, John Martin, et al.
U.S. Appl. No. 12/421,613, filed Apr. 9, 2009, Keagy, John Martin, et al.
U.S. Appl. No. 12/421,614, filed Apr. 9, 2009, Keagy, John Martin, et al.
U.S. Appl. No. 12/841,150, filed Jul. 21, 2010, Lappas, Paul, et al.
U.S. Appl. No. 12/841,151, filed Jul. 21, 2010, Lappas, Paul, et al.
U.S. Appl. No. 12/841,156, filed Jul. 21, 2010, Lappas, Paul, et al.
U.S. Appl. No. 12/841,158, filed Jul. 21, 2010, Lappas, Paul, et al.
U.S. Appl. No. 12/841,161, filed Jul. 21, 2010, Lappas, Paul, et al.
U.S. Appl. No. 12/841,162, filed Jul. 21, 2010, Lappas, Paul, et al.
U.S. Appl. No. 12/841,164, filed Jul. 21, 2010, Lappas, Paul, et al.
U.S. Appl. No. 13/023,514, filed Feb. 8, 2011, Lin, Yueqin, et al.
U.S. Appl. No. 13/023,517, filed Feb. 8, 2011, Berryman, Martin A., et al.
U.S. Appl. No. 13/023,520, filed Feb. 8, 2011, Angrish, Yogesh, et al.
Author Unknown, "Press Release: 3Tera adds Application Monitoring and Multi-CPU Scalability to AppLogic Utility Computing Platform for SaaS and Web 2.0 Customers," May 24, 2007, http://www.3tera.com/News/Press-Releases/Archive/3Tera-adds-Application-Monitoringand-Multi-CPU-Scalability-to-AppLogic.php, 3TERA, Inc., Aliso Viejo, California, USA.
Author Unknown, "Amazon Elastic Compute Cloud (Amazon EC2)—Limited Beta," Jul. 2007 (web page archive date from web.archive.org), http://web.arch ive.org/web/20070705164650rn 2/www .amazon .com/b?ie=UTF8&node=20 159 0011, Amazon.Com, Inc.

(56) References Cited

OTHER PUBLICATIONS

Author Unknown, "Amazon Elastic Compute Cloud (Amazon EC2)—Limited Beta FAQs," Jul. 2007 (web page archive date from web.archive.org), http://web.archive.org/web/20070626055456/www.amazon.com/b?ie=UTF8&node=201591011, Amazon.Com, Inc.

Author Unknown, "Amazon EC2: Developer Guide (API Version Jun. 26, 2006)," 2006 (Month NA), Amazon.Com, Inc., Seattle, Washington, USA.

Author Unknown, "Amazon EC2: Developer Guide (API Version Oct. 1, 2006)," 2006 (Month NA), Amazon.Com, Inc., Seattle, Washington, USA.

Author Unknown, "Amazon EC2: Developer Guide (API Version Jan. 3, 2007)," 2007 (Month NA), Amazon.Com, Inc., Seattle, Washington, USA.

Author Unknown, "Amazon EC2: Developer Guide (API Version Jan. 19, 2007)," 2006 (Month NA), Amazon.Com, Inc., Seattle, Washington, USA.

Author Unknown, "Amazon EC2: Developer Guide (API Version Mar. 1, 2007)," 2007 (Month NA), Amazon.Com, Inc., Seattle, Washington, USA.

Author Unknown, "Amazon EC2: Developer Guide (API Version Aug. 29, 2007)," 2007 (Month NA), Amazon.Com, Inc., Seattle, Washington, USA.

Author Unknown, "AppLogic 2.0—What's new," Jul. 2007 (web page archive date from web.archive.org), http://web.archive.org/web/20070701162502/www.3tera.com/applogic20.html, 3TERA, Inc.

Author Unknown, "AppLogic Overview," Jul. 2007 (web page archive date from web.archive.org), http://web.archive.org/web/20070701161932/www.3tera.com/applogic.html, 3TERA, Inc.

Author Unknown, "AppLogic Usage," Jul. 2007 (web page archive date from web.archive.org),http://web.arch ive.org/web/20070712042731/www .3tera. com/applogicusage. html, 3TERA, Inc.

Author Unknown, "AppLogic User Interface," Jul. 2007 (web page archive date from web.archive.org), http://web.archive.org/web/20070704235539/www.3tera.com/applogicui.html, 3TERA, Inc.

Author Unknown, "AppLogic Hardware Configuration," Jul. 2007 (web page archive date from web.archive.org), http://web.archive.org/web/20070707062814/www.3tera.com/applogichw .html, 3TERA, Inc.

Author Unknown, "Applogic Features," Jul. 2007 (web page archive date from web.archive.org ), http://web.arch ive.org/web/20070630051607 /www. 3tera. com/applogicfeatures.html, 3TERA, Inc.

Author Unknown, "Applogic—Application Monitoring," Jul. 2007 (web page archive date from web.archive.org), http://web.archive.org/web/20070629035849/www.3tera.com/applogic monitor.html, 3TERA, Inc.

Author Unknown, "Applogic Users," Jul. 2007 (web page archive date from web .archive. o rg ), http ://web. archive .o rg/web/2007 0630061258/www. 3te ra. com/a p plogicusers.html, 3TERA, Inc.

Author Unknown, "Applogic 2.0 Beta Program," Jul. 2007 (web page archive date from web.archive.org),http://web.archive.orQ/web/20070701162528/www.3tera.com/apploQic20beta.html, 3TERA, Inc.

Author Unknown, "Introduction to VMware Infrastructure: ESX Server 3.5, ESX Server 3i version 3.5, VirtualCenter 2.5," Dec. 2007, pp. 1-46, Revision: 20071213, VMware, Inc., Palo Alto, California, USA.

Author Unknown, "iSCSI San Configuration Guide: ESX Server 3.5, ESX Server 3i version 3.5, VirtualCenter 2.5," Nov. 2007, pp. 1-134, Revision: 20071129, VMware, Inc., Palo Alto, California, USA.

Author Unknown, "The first grid operating system that runs and scales existing web applications," Jun. 2006 (web page archive date from web.archive.org), http://web.archive.orQ/web/20060627045727/www.3tera.com/, 3TERA, Inc.

Author Unknown, "Utility Computing—the easy way to run and scale online applications," Jul. 2007 (web page archive date from web.archive.org), http:/lweb.archive.org/web/20070718011 012/www.3tera.com/, 3TERA, Inc.

Author Unknown, "VMware Infrastructure 3 Primer: ESX Server 3.5, ESX Server 3i version 3.5, VirtuaiCenter 2.5," Nov. 2007, Revision: 20071129, VMware, Inc., Palo Alto, California, USA.

U.S. Appl. No. 13/481,762, filed May 25, 2012, Keagy, John Martin, et al.

U.S. Appl. No. 13/607,642, filed Sep. 7, 2012, Lappas, Paul, et al.

Portions of prosecution history for U.S. Appl. No. 13/023,517, Oct. 4, 2012, Berryman, Martin A., et al.

Author Unknown, "Cisco Nexus 7000 Series NX-OS Interfaces Configuration Guide, Release 5.x," Sep. 5, 2012, Chapter 9, pp. 1-18, Cisco Systems, Inc., San Jose, California, USA.

Author Unknown, "Standardizing Data Center Server-Network Edge Virtualization," Oct. 2010, pp. 1-14.

\* cited by examiner

SYSTEM AND METHOD FOR CONFIGURING AND MANAGING VIRTUAL GRIDS

BACKGROUND

Hosting services provide a means whereby multiple users can implement custom server configurations without the overhead costs associated with purchasing, upgrading, and maintaining the equipment needed to implement the configuration. In some cases, a hosting service provider maintains and provisions a grid of hardware nodes that are shared amongst the multiple users. More specifically, resources of a single node can be partitioned and each of these partitions can be allocated to host a server configuration of a different user.

Virtualization provides the means for partitioning the hardware resources amongst the multiple server configurations. Virtualization creates the façade that each server configuration is individually hosted on dedicated equipment with a particular set of resources. Two or more server configurations are provided non-conflicting sets of resources of the same hardware node such that a guaranteed amount of processing resources is available to each such configuration. In other words, a single physical resource is partitioned to operate as multiple logical resources.

In some cases, a hosting service may lease dedicated equipment for users to implement their custom server configurations. The dedicated equipment in some instances may provide higher reliability, increased performance, and greater security as its hardware resources are not shared amongst multiple users. For instance, dedicated servers may be ideal for running applications that users do not want on a multi-tenant environment. One example of such an application is a database application that requires Payment Card Industry (PCI) Data Security Standard compliance.

To facilitate the hosting services, users typically place orders for hardware configurations requiring certain functionality. Users fill out forms or place telephone calls to specify their configurations. At the hosting service site, system operators review the requests and manually determine which nodes or dedicated equipment to distribute the configurations. The operators then configure the nodes or equipment and install software as specified within the order requests.

In some cases, a hosting service may include multiple grids supporting server configurations for different users. However, limitations of virtual local area network (VLAN) protocol (e.g., 802.1Q) may cause problems when deploying network configurations of servers on one switched network. For instance, the VLAN protocol may specify that a VLAN identification (IDs) includes 12 bits of data. This limits the maximum number of unique VLAN IDs to around 4096 (2^12) per switched network. As a result, once the available VLAN IDs are utilized, the servers of different users may not be able to be bridged on to the same switched network as it will break the logical division of the users' network configurations.

Reserving one or more switches for servers on a per-grid basis adversely affects scalability, manageability, and capacity planning, and results in suboptimal resource utilization. Furthermore, the problem of configuring and managing separate network switches for different grids may escalate as new grids are added to the hosting service. Similarly, reserving a hardware node for servers on a per-grid basis adversely affects scalability, manageability, and capacity planning, and results in suboptimal resource utilization.

BRIEF SUMMARY

Some embodiments provide a hosting system for provisioning and managing servers (e.g., virtual servers, dedicated servers). In some embodiments, the system includes a front-end user interface (UI) that allows user to configure, provision, and control virtual and dedicated servers through UI elements. For instance, the front-end UI may include different UI controls that can be used to define configurations for a dedicated server. Examples of such configurations include hardware specifications (e.g., memory, CPU, storage), image specifications (e.g., operating system, applications), network specifications (e.g., IP address), etc.

When a server configuration is received through the front-end UI, the hosting system, in some embodiments, sends the server configuration to its back-end logic and automatically deploys the server configuration. In some embodiments, the back-end portion of the system includes different deployment managers that perform different provisioning tasks. For example, a virtual server may be logically partitioned and configured on a particular node in a grid of hardware resources through one deployment manager, while a dedicated server may be configured through another different deployment manager. In addition, one datacenter at a first location may have a different set of deployment managers than another datacenter at a second location.

To interface with different types of deployment managers, the hosting system of some embodiments includes a resource management module. In some embodiments, the resource management module (1) receives a user request from the front-end UI, (2) identifies a deployment manager that can fulfill the user request, and (3) sends the user request to the identified deployment manager. The resource management module may also identify a datacenter location of the deployment manager.

In some embodiments, the hosting system receives a configuration for one or more servers for a particular entity (e.g., customer, user). The hosting system then identifies a grid identity and a set of virtual local area network (VLAN) identities for the particular entity. The hosting system then deploys the set of servers on one or more of the hardware nodes using the grid identity and the set of VLAN identities. In some embodiments, the set of VLAN identities includes a first VLAN identity for a private network and a second VLAN identity for a public network.

In some embodiments, the hosting system determines whether a grid identity has been assigned to the customer, and assigns the grid identity upon determining that a grid identity has not been assigned. The hosting system of some embodiments determines whether private and public VLAN identities have been assigned to the customer. To make this determination, the hosting system may access a customer database that stores data for the customer. When the determination is made that the VLAN identities have not been assigned to the customer, the hosting system assigns the VLAN identities and marks those VLAN identities as identities that are not available for other customers.

As mentioned above, the VLAN protocol places a limit on the number of available VLANs. In some embodiments, the hosting system extends the number of available VLANs beyond the limitations of the VLAN protocol by using another protocol. Different embodiments can use different protocols to extend the range of available VLANs. For example, some embodiments utilize an 802.1QinQ protocol. In some such embodiments, the grid identity is used as the outer VLAN tag and the VLAN identity (e.g., public VLAN identity or private VLAN identity) is used as the inner VLAN tag. In some embodiments, the hosting system defines a universal hardware node based on its network architecture. To define the universal hardware node, the hosting of some embodiments performs a mapping of the grid identity and the VLAN identity (e.g., the public VLAN identity or private VLAN identity) to a VLAN identity of a switch that is coupled to the node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
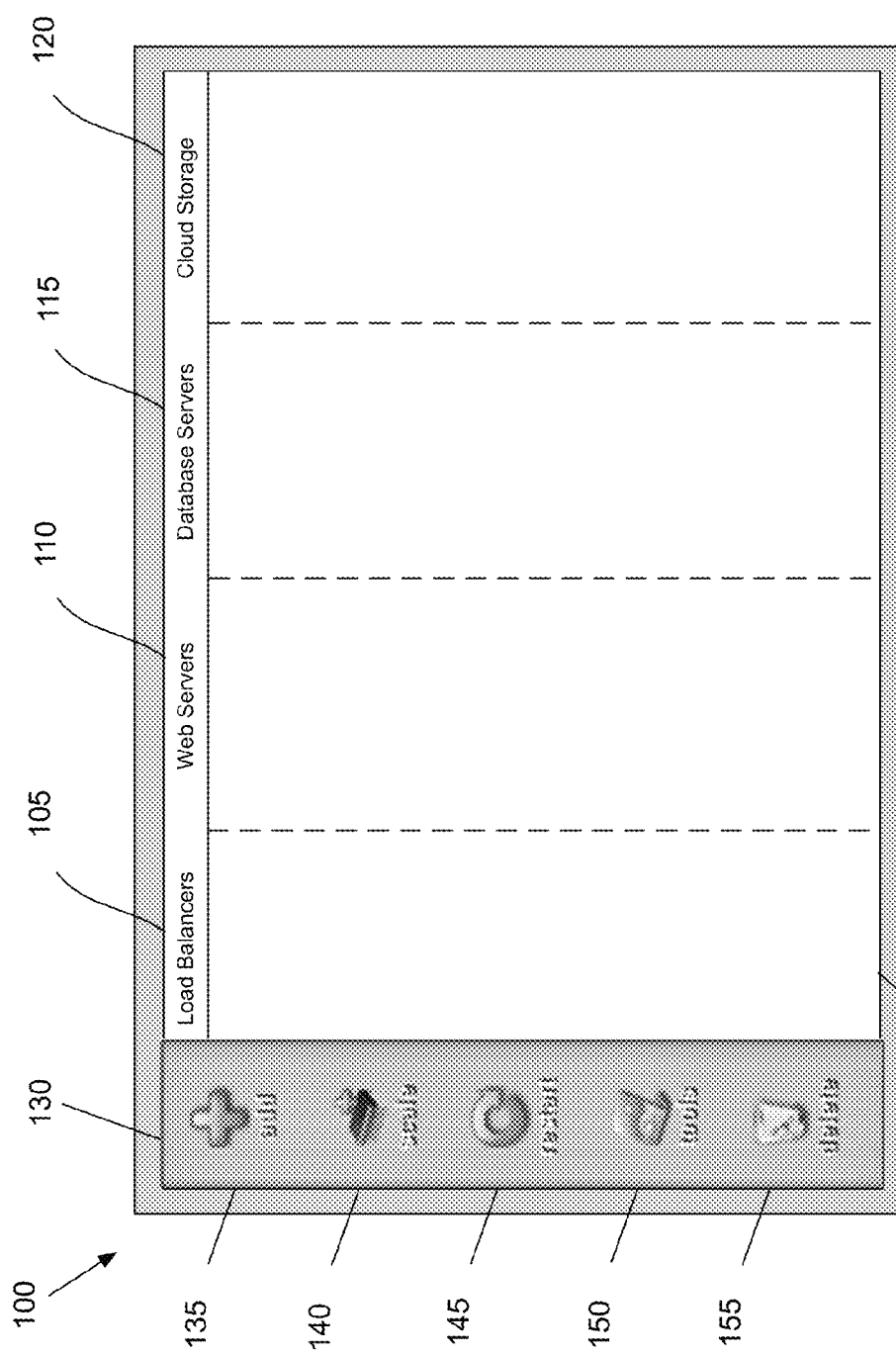
FIG. 1 illustrates an exemplary multi-server control panel of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a hosting system for provisioning and managing servers (e.g., virtual servers, dedicated servers). In some embodiments, the system includes a front-end user interface (UI) that allows user to configure, provision, and control virtual and dedicated servers through UI elements. For instance, the front-end UI may include different UI controls that can be used to define configurations for a dedicated server. Examples of such configurations include hardware specifications (e.g., memory, CPU, storage), image specifications (e.g., operating system, applications), network specifications (e.g., IP address), etc.

When a server configuration is received through the front-end UI, the hosting system, in some embodiments, sends the server configuration to its back-end logic and automatically deploys the server configuration. In some embodiments, the back-end portion of the system includes different deployment managers that perform different provisioning tasks. For example, a virtual server may be logically partitioned and configured on a particular node in a grid of hardware resources through one deployment manager, while a dedicated server may be configured through another different deployment manager. In addition, one datacenter at a first location may have different set of deployment managers than another datacenter at a second location.

To interface with different types of deployment managers, the hosting system of some embodiments includes a resource management module. In some embodiments, the resource management module (1) receives a user request from the front-end UI, (2) identifies a deployment manager that can fulfill the user request, and (3) sends the user request to the identified deployment manager. The resource management module may also identify a datacenter location of the deployment manager.

In some embodiments, the hosting system receives a configuration for one or more servers for a particular entity (e.g., customer, user). The hosting system then identifies a grid identity and a set of virtual local area network (VLAN) identities for the particular entity. The hosting system then deploys the set of servers on one or more of the hardware nodes using the grid identity and the set of VLAN identities. In some embodiments, the set of VLAN identities includes a first VLAN identity for a private network and a second VLAN identity for a public network.

As mentioned above, the VLAN protocol places a limit on the number of available VLANs. In some embodiments, the grid identity is used to extend the number of available VLANs. For example, by using another protocol such as an 802.1QinQ protocol, the hosting system can extend the number of available VLANs by utilizing the grid identity as an outer VLAN tag and the VLAN identity as an inner VLAN tag. In some such embodiments, the hosting system maps the grid and VLAN identities (e.g., public VLAN identity, private VLAN identity) to a switch VLAN identity.

Several more detailed embodiments of the invention are described in the sections below. Section I provides an overview of a multi-server control panel according to some embodiments. Sections II provides a conceptual architecture diagram of the hosting system of some embodiments. Section III describes an example configuration of the hosting system to provide virtual grids of hardware resources. Section IV describes an example configuration of the hosting system to provide grid-independent hardware nodes. Finally, Section V describes a computer system which implements some embodiments of the invention.

I. Multi-Server Control Panel User Interface

A. Configuring and Modifying Servers

Some embodiments provide a graphical user interface ("GUI") that allows users to manage servers (e.g., virtual servers, dedicated servers). Several examples of such a GUI are given below. In several of these examples, the GUI is referred to as a multi-server control panel because it allows the users to configure, provision, and control the servers through UI elements.

In some embodiments, the multi-server control panel provides UI elements that allow users to provision or configure servers by specifying parameters that define or redefine the attributes of the servers. The multi-server control panel of some embodiments displays representations of the servers organized into several tiers, where each tier represents a layer in a server configuration. In other words, each tier represents a logical application layer (e.g., a load balancing layer, a web server layer, an application server layer, a database server layer, a storage layer, etc.) in a multi-server configuration.

FIG. 1 illustrates an exemplary multi-server control panel 100 of some embodiments of the invention. The multi-server control panel 100 includes (1) a display area 125 for displaying representations (e.g., graphical, textual) of servers, and (2) a set of controls 130 for adding, deleting, and managing the servers. In some embodiments, the set of controls 130 includes an add button 135, a scale button 140, a restart button 145, a tools button 150, and a delete button 155. The set of controls may also include other controls such as an edit button, a start button, a suspend button, and a view button.

In the example illustrated in FIG. 1, the display area 125 is organized into columns that represent several tiers. The display area 125 includes a load balancer tier 105, a web server tier 110, a database server tier 115, and a storage tier 120. The tier organization allows a user to assess a server topology. This tier organization allows the user to scale the server topology by adding one or more servers to, or deleting one or more servers from, a particular tier using the multi-server control panel. For example, a user can scale the system topology by adding a second web server to support a first web server. The user can also scale the system topology by adding another tier (e.g., by adding an application server to a multi-server configuration that includes a load balancer, a web server, and a database).

In some embodiments, this tier organization allows the user to scale the server topology by adding one or more storages (e.g., cloud storages as represented by the storage tier 120). For instance, with the multi-server control, a user can easily allocate a particular amount of storage that he or she intends to use and offload storage maintenance tasks to the hosting service. As a result, the user does not have to buy, upgrade, and maintain physical storages.

Another way in which this tier organization allows the user to scale the server topology is by allowing the users to increase allocated resources (e.g., memory, storage, bandwidth, CPU) for any server in the server topology. That is, the user is not limited to increasing the server topology only vertically (e.g., along the tier organization of the display area 125), but may also increase the server topology horizontally by allocating additional resources for one or more servers in the server topology. Some embodiments of the multi-server control panel provide UI elements that allow a user to specify one or more attributes of a server (e.g., one or more attributes of a load balancer, a web server, an application server, a database server, etc). Examples of such attributes include the amount of memory, the OS of the server, and the name of the server.

Sections B and C below provide several more detailed examples of how a user can use the multi-server control panel to configure and add servers to a server topology. In particular, Section B describes adding a virtual server to the server topology, and Section C describes adding a dedicated server to the server topology.

B. Adding a Virtual Server

FIGS. 2-5 present several illustrative examples regarding how a user can add a virtual server through the multi-server control panel 100. Specifically, these figures illustrate examples of (1) selecting a web server from a list of available server types, (2) selecting an image containing an operating system for the virtual server, (3) specifying parameters that define the virtual server, and (4) adding the virtual server to a server configuration.

Figure 2:
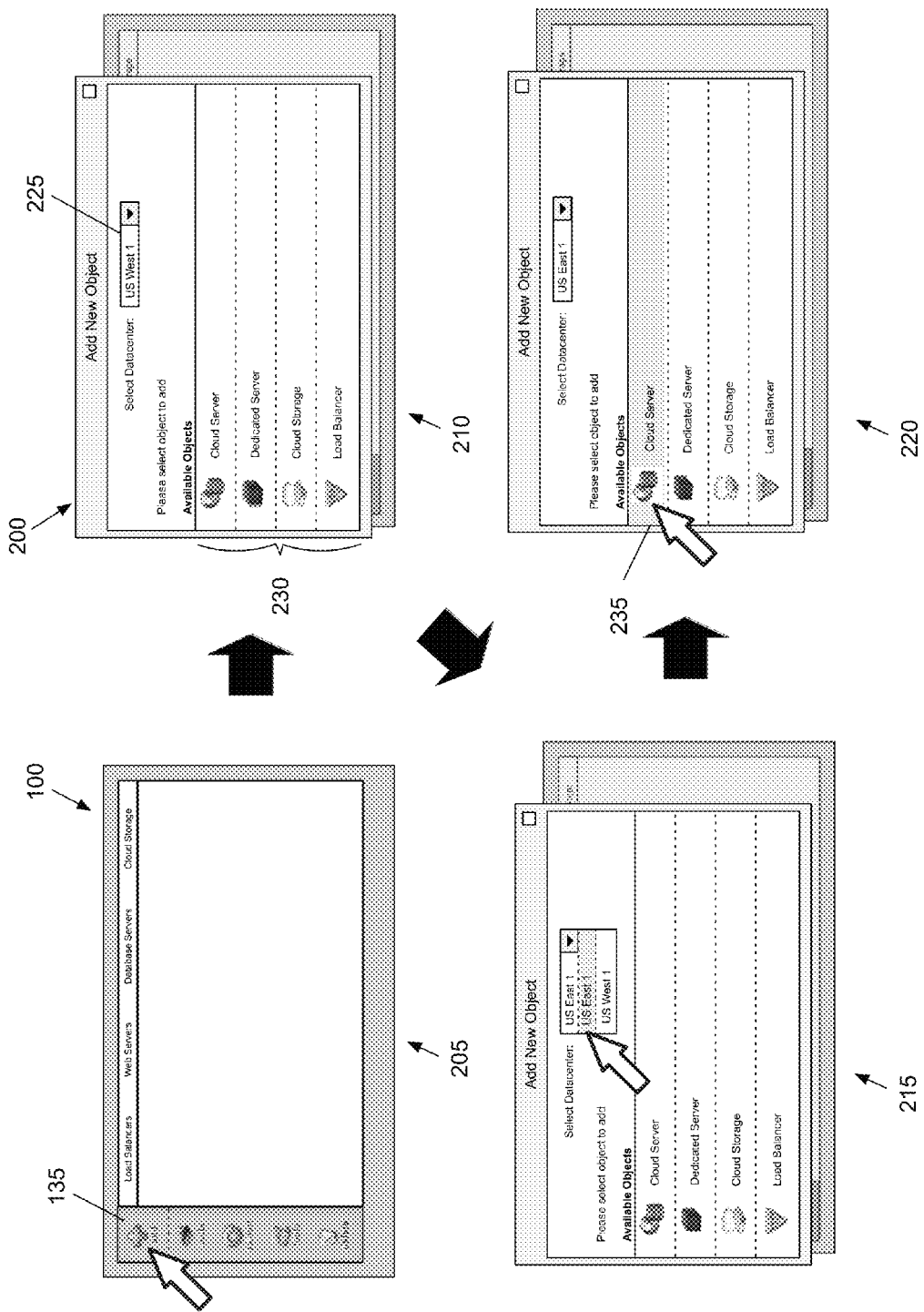
FIG. 2 presents an illustrative example of selecting a web server to add to a server configuration.

FIG. 2 presents an illustrative example of selecting a web server to add to a server configuration. In particular, four operational stages 205-220 of the multi-server control panel 100 are shown. A user can begin the process of adding a web server to a server configuration by selecting the add button 135 through a selection input such as input received from a cursor controller (e.g., a mouse, touchpad, trackpad, etc.), from a touchscreen (e.g., a user touching a UI item on the touchscreen), from keyboard input (e.g., a hotkey, key sequence), etc. In the example illustrated in FIG. 2, the selection of the add button 135 causes an object selection window 200 to be displayed.

As shown in stage 210, the object selection window 200 has a list of selectable icons 230 and a datacenter field 225. The list of selectable icons 230 represents different server configuration components or objects (e.g., server, load balancer, storage) that a user can add to a server configuration. In the example illustrated in FIG. 2, the list of selectable icons 230 includes icons for a cloud server, dedicated server, cloud storage, and load balancer. Here, the cloud server represents either a web server or a database server. As will be described below by reference to FIG. 3, in some embodiments, a server is defined as a web server or database server based on the application selected for the server. For example, a server may be defined as a database server when an image selected for the server includes an operating system that is preconfigured with a database application (e.g., SQL server).

The datacenter field 225 allows a user to select a datacenter to host the server configuration. In the example shown in stage 215, the user can select either "US East 1", which represents a datacenter located in the Eastern United States, or "US West 1", which represents a datacenter located in the Western United States. However, additional user-selectable items representing other locations may be available depending on the locations of datacenters of the hosting system (e.g., hosting service provider). The datacenter field 225 may also list datacenters differently. For instance, the datacenter field 225 may list each datacenter with more specific location information such as state, city, street address, etc.

In some embodiments, the selection of a datacenter (e.g., "US West 1") modifies the available selectable icons in the list of selectable icons 230. That is, several selectable icons may be presented or removed based on the services provided by the selected datacenter. For instance, a selection of a particular datacenter may cause an icon corresponding to the cloud storage to be removed from or presented in the list of selectable icons 230.

When the user scrolls through the object list 230, the selected icon may be highlighted. This is shown in the fourth stage 220 with the icon 235 for the cloud server highlighted, while the icons for the dedicated server, cloud storage, and load balancer are not highlighted. The user can select any of the icons in the object list 230 (e.g., by clicking on them or by scrolling to them and pressing the enter key). When the user selects the cloud server icon 235 in the object list 230, the user is presented with an image list window 300, as illustrated in FIG. 3.

Figure 3:
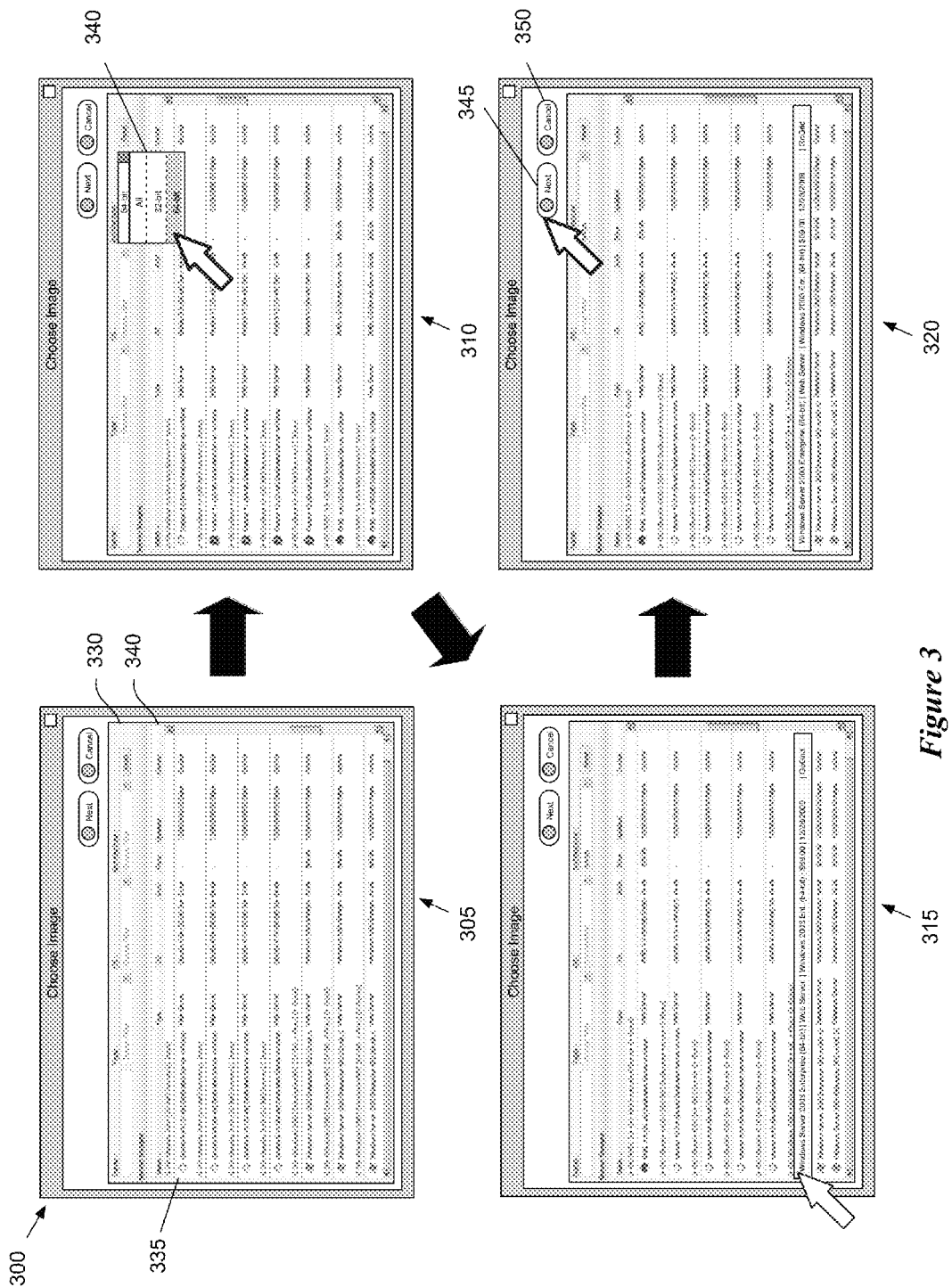
FIG. 3 presents an illustrative example of specifying an operating system for the web server.

FIG. 3 presents an illustrative example of specifying an operating system for the cloud server by using the image selection window 300. Specifically, this figure shows four operational stages 305-320 of selecting an image that includes the operating system. In some embodiments, an image is a copy of the entire state of an operating system. The image may contain just an operating system or the operating system preconfigured with one or more applications. In some embodiments, the images include operating systems with preconfigured web servers that support dynamic web content. The operating system may also be preconfigured with web servers that include an application server or a web application framework such as Ruby on Rails.

In some embodiments, the cloud server is defined as a web server, database server, or application server based on one or more applications that is installed or preconfigured on the operating system. For example, a server may be defined as a database server when an image selected for the server includes an operating system that is preconfigured with a database application (e.g., SQL server). Also, a server may be defined as a web server when an image having an operating system preconfigured with a web server or application server is selected for the server. Furthermore, a server may be defined by default as a web server, application server, or database server when an operating system is not preconfigured with any application.

As shown in the first stage 305, the image selection window 300 includes an image list 335 and a filter tool 330. The image list 335 is an area in the window 300 that lists all available images from which the user can choose the selected cloud server. In some embodiments, the list of images 335 represents images in one or more image repositories or libraries. The list 335 may include images provided by the hosting service. The list 335 may further include images provided by other users (e.g., customers, general public, etc). Alternatively, the list 335 may include only images provided by other users in some embodiments.

In the example illustrated in FIG. 3, several different selectable images are displayed. Several of these images include Linux distributions, while others include Windows® operating systems. The images are also classified as either a web server or a database server. Also, several of the listed images are only available for dedicated severs, and others are available for all types of servers. The list 335 may be sequentially organized by the name of the operating system, the type of server (e.g., web server, database server), the type of operating system, architecture (e.g., 32-bit, 64-bit), price, date updated, and owner.

In some embodiments, the images may also be organized or classified by system requirements. In other words, different images may have different system requirements. These requirements may include memory, storage, processor, etc. For instance, some images may be available for a web server that has a minimum of one gigabyte of random access memory (RAM). Also, some images may support a maximum of sixteen gigabytes of RAM. As shown in the first stage 305, the list 335 is alphabetically organized by name based on a sorting tool 340.

The filter tool 330 is a user interface item provided in the image selection window 300 that allows the user to search or filter the image list 335 based on one or more criteria. In the example illustrated in FIG. 3, the user can filter the image list 335 based on the name of the operating system and architecture. The user can also filter the image list 335 based on different types of servers. For instance, the image list 335 may be filtered to only display images that are defined as a web server or database server. Also, the user can reset the filter tool 330 by selecting a reset button.

Having described the image selection window 300, the operations of selecting an image will now be described by reference to the state of this window at the four stages 305-320. In the first stage 305, the image list 335 lists several images from which the user can choose the cloud server. The second stage 310 shows the user filtering the image list 335 based on the architecture of the operating system. Specifically, a field 340 of the filter tool 330 is selected to reveal a drop-down list of different architecture filters (i.e., 32-bit, 64-bit). The user chooses the 64-bit filter which causes the image list 335 to display only those operating systems matching the filter, as illustrated in the third stage 315.

In the third stage 315, as the user scrolls through the list of images 335, the selected image is highlighted. Here, the user selects an image containing a Windows operating system that is defined as a web server. Lastly, the fourth stage 320 show the user's selection of the "Next" button 345 to proceed with configuring the web server. Optionally, the user can cancel the process of adding the web server by selecting the "Cancel" button 350. When the user selects the next button 345, the user is presented with a cloud server form 400, as illustrated in FIG. 4.

Figure 4:
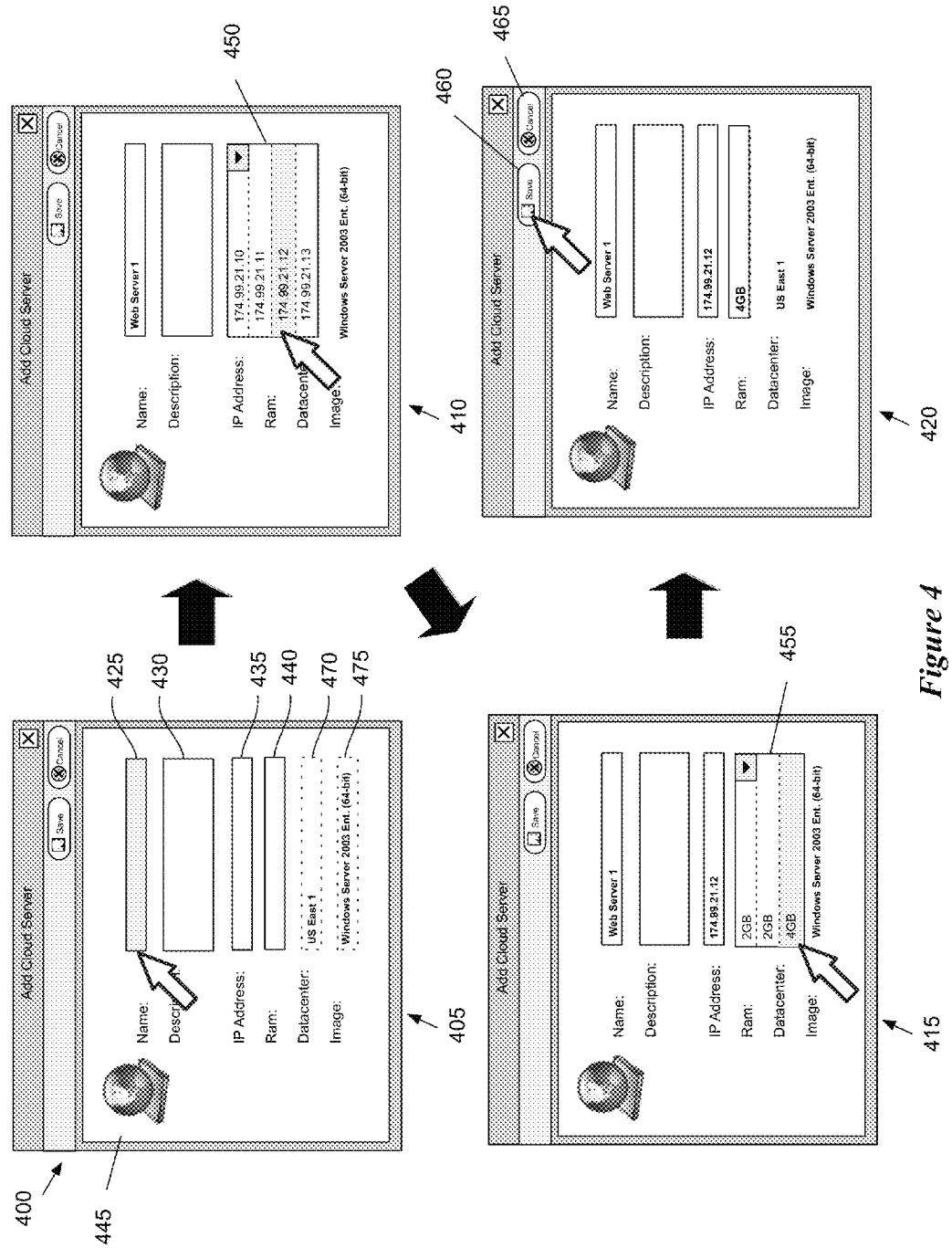
FIG. 4 provides an illustrative example of configuring the web server.

FIG. 4 provides an illustrative example of configuring a web server using the cloud server form 400. Specifically, this figure shows four operational stages 405-420 for defining a web server that will be added to the server configuration. However, before describing these stages, several elements of the cloud server form 400 will be described. As shown in the figure, the cloud server form 400 includes a name field 425, a description field 430, an Internet protocol (IP) address field 435, and a memory field 440. The cloud server form 400 also includes several static items based on previously selected options. Specifically, the cloud server form 400 includes (1) a datacenter label 470 that indicates the selected datacenter as "US East 1", (2) an image label 475 that indicates the selected image as a 64-bit Windows operating system, and (3) icon 445 that indicates that the cloud server is to be represented as a web server (e.g., in the web server tier 110 of the display area 125) based on the selected image.

The name field 425 allows the user to specify a descriptive name or site name (e.g., "Web Server 1", "www.abc.com") for the web server. In some embodiments, the name field 425 is automatically populated. For example, when a user specifies a site name during a sign-up process, the name field 425 is automatically populated with the site name provided by the user.

The description field 430 is an optional field that allows the user to describe the web server. For example, through the description field 430, the user can input self-describing information such as the date the web server was added, the content of the web pages provided by the web server, etc.

The IP address field 435 allows the user to specify an IP address for the web server. In some embodiments, the IP address field 435 is implemented as a drop-down menu that opens to provide a list of IP addresses that are available for a user to choose as an IP address for the web server. In some embodiments, the available IP addresses are based on a specified hosting plan. For instance, if a user signs up for a particular hosting plan, the multi-server control panel might display ten IP addresses for the servers in the configuration. However, if the user signs up for a different hosting plan, the multi-server control panel might display twenty IP addresses for the servers. In some embodiments, the IP address may be from an IP subnet allocated to a customer's virtual local area network (VLAN).

The memory field 440 allows the user to specify the amount of memory (e.g., RAM in some embodiments) that the user wants to allocate to the web server. Different embodiments allow the user to specify this amount differently. For instance, some embodiments allow a user to enter a numerical amount for the memory. Other embodiments allow the user to enter a percentage that specifies the percentage of an overall amount of memory that the user has purchased for his entire configuration or a particular tier of his configuration. For instance, a user might select a hosting plan with one hundred gigabytes of memory. In such a case, a user might then enter 10% in the memory field. This entry then allocates ten gigabytes of memory to the web server. If the user subsequently changes to a different hosting plan that includes more or less memory, the allocated memory for the web server is automatically adjusted to reflect the change in the hosting plan. In some embodiments, this field is implemented as a pull-down menu that opens to provide a list of selectable memory values from which the user can choose the web server.

Instead of or in conjunction with the memory field 440, other embodiments might include fields for other resources in the web server form 400. Examples of such other resources include physical resources (e.g., storage space, number of CPUs, CPU cycles, etc.), and network resources (e.g., data transfer).

Having described the elements of the cloud server form 400, the operations of configuring a web server will now be described by reference to the state of this form at the four stages 405-420. In the first stage 405, the cloud server form 400 displays several indications related to the previously selected options. Specifically, the datacenter label 470 indicates that the selected datacenter is "US East 1", and the image label 475 indicates that the selected image includes a Windows operating system that is 64-bit. In the first stage 405, the name field 425 is selected (e.g., through a cursor click operation, through a touch operation, etc.) to allow the user to input a name for the web server.

Stage two 410 shows the cloud server form 400 after the user has specified a name for the web server. Here, the IP address field 435 is selected to reveal a drop-down list of different IP addresses 450 from which the user can choose the web server. As the user scrolls through the list 450, the selected IP address is highlighted. Similarly, in stage three 415, the user specifies the amount of memory to allocate to the web server using the memory field 440. In this example, the user selects "4 GB" from a drop-down list 455 of the memory field 440. The fourth stage 420 shows the user's selection of the "Save" button 460 to proceed with configuring the web server. Alternatively, the user can cancel the process of adding the web server by selecting the "Cancel" button 465.

Figure 5A:
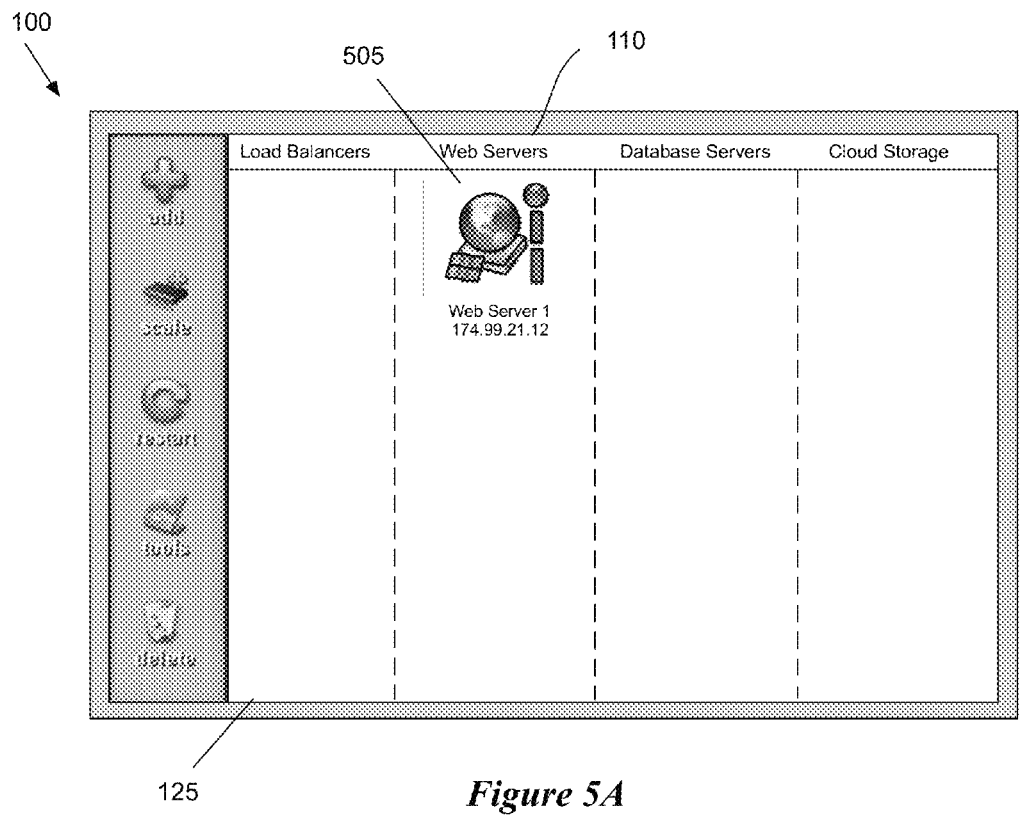
FIG. 5A illustrates the multi-server control panel displaying a web server representation.

FIG. 5A illustrates the display area 125 of the multi-server control panel 100 after the user fills the cloud server form 400 and selects the "Save" button 460 on the form. The selection of the "Save" button 460 causes the front-end logic to define the web server to add a graphical representation 505 of this web server to the web server tier 110 that is displayed in the display area 125. Once a user specifies or modifies a configuration for a server using the server form (e.g., the cloud server form 400) and selects the "Save" button 460, a scheduler identifies in real-time a hardware node from several different hardware nodes, and a deployment manager deploys the server in real-time on the identified hardware node according to the configuration. Alternatively, some embodiments include a commit button. Once the user specifies or modifies one or more server components of the configuration, the user selects the commit button (e.g., by clicking on this button) to direct the scheduler to perform its mapping or remapping of the server components, and to direct the deployment manager to deploy the configuration or modify the deployment of the configuration.

Figure 5B:
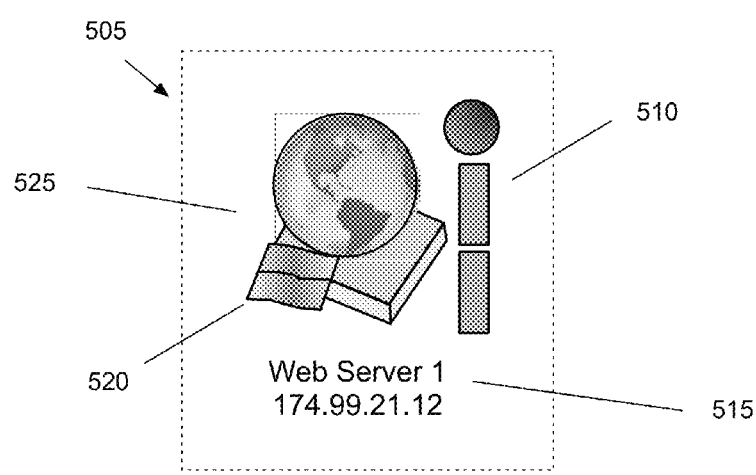
FIG. 5B provides a close-up view of the web server representation.

FIG. 5B provides a close-up view of an example web server representation of the multi-server control panel 100. In this example, the web server representation 505 has a textual element 515 and a graphical element 525. The textual element 515 identifies the web server as "Web Server 1". The textual element 515 of some embodiments identifies the web server by a specified hostname. For instance, if the user specifies the hostname (e.g., "www.abc.com") through the name field 425 of the cloud server form 400, then the display area might display the specified name. In the example illustrated in FIG. 5B, the textual element includes an IP address of the web server.

The graphical element 525 includes a web server icon 520 and a resource meter 510. The web server icon 520 is a graphical representation of the web server. In some embodiments, the web server icon 520 provides an indication of the operating system installed on the web server. For instance, if the user selects an operating system image that includes a particular Linux distribution, the web server icon 520 may display a representation of the particular distribution. As shown in FIG. 5B, the web server icon 520 displays an indication that the operating system selected for the web server is a Windows operating system.

The resource meter 510 is a meter that displays usage of several resources (e.g., CPU and memory) in real-time. In the example illustrated in FIG. 5B, the top resource meter represents CPU usage, and the bottom resource meter represent memory usage. Each meter displays the real-time usage by fluctuating (e.g., moving a bar within the meter) in accord with the real-time usage of the corresponding server. In some embodiments, the fluctuating graphical display is indicative of usage of the resource at different instances in time and/or is indicative of real-time or near-real time usage of the resource.

Also, the fluctuating graphical display changes color in some embodiments when the usage of the particular resource exceeds a particular threshold. For instance, in some embodiments, the bar within a meter changes color when resource usage goes over a predetermined threshold for the resource. One such example is when the memory usage exceeds 50 percent of an allotted memory capacity, the bottom resource meter might change from one color to another color (e.g., from green to yellow). The threshold in some embodiments is an expected usage rate over a duration of time based on the amount of a particular resource that is assigned to the particular user. Hence, the top and bottom meters may display different colors at different instances in time to indicate excess usage of the resource. These fluctuating meter bars and changing colors provide a quick visual indication of whether the CPU and memory is being overloaded or "thrashed." Hence, these icons are referred to as "thrash-o-meters" in some embodiments. Instead of or in conjunction with CPU and memory, some embodiments of the multi-server control panel provide real-time usage of other resources. These other resources include network resources (e.g., network traffic, data transfer) and other physical resources (e.g., storage space).

C. Adding a Dedicated Server

FIGS. 6-9 present several illustrative examples regarding how a user can add a dedicated server through the multi-server control panel 100. Specifically, these figures illustrate examples of (1) selecting a dedicated server from a list of available server types, (2) selecting an image containing an operating system for the dedicated server, (3) specifying parameters that define the dedicated server, and (4) adding the dedicated server to a server configuration.

Figure 6:
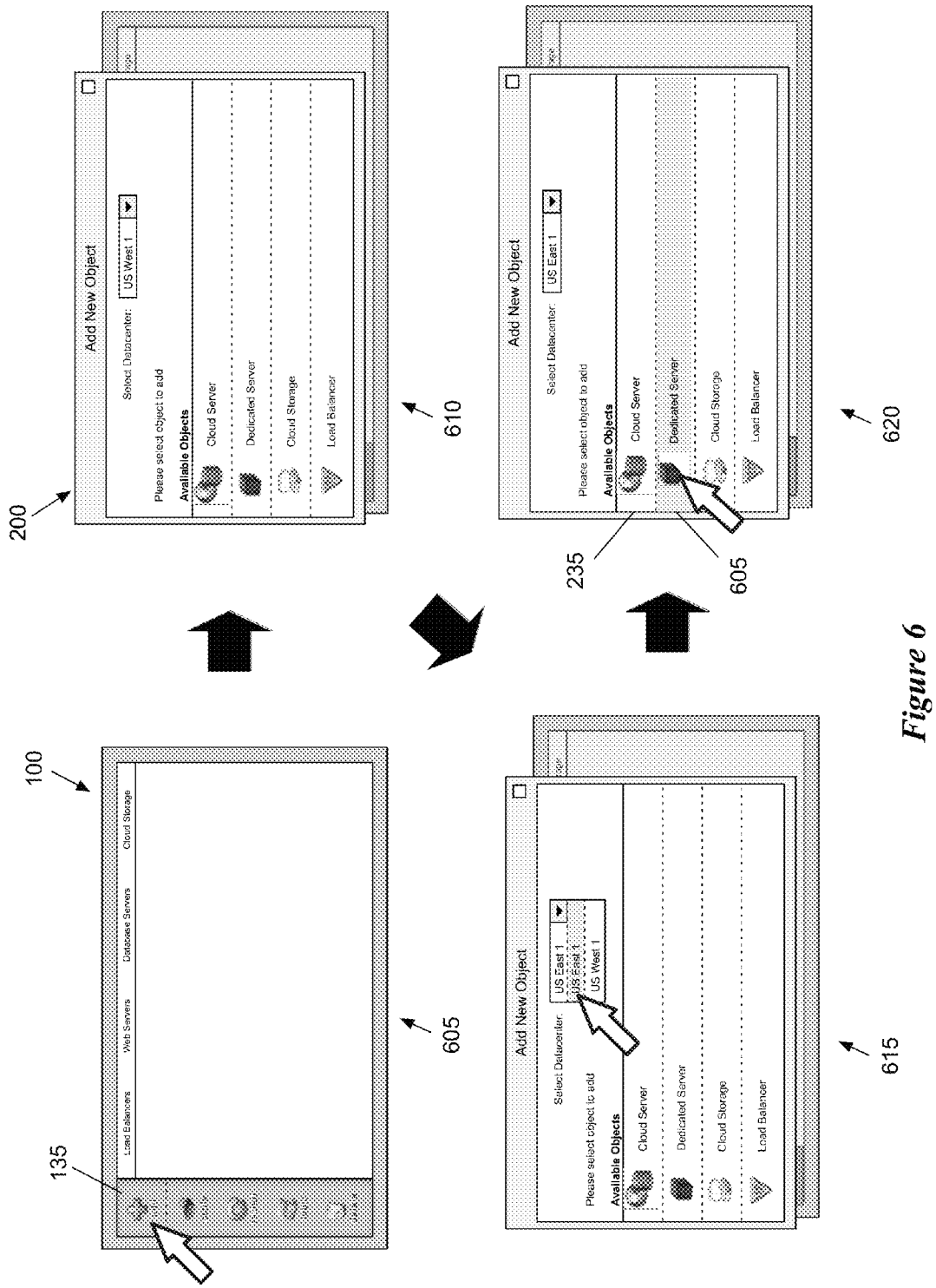
FIG. 6 presents an illustrative example of selecting a dedicated server to add to a server configuration.

FIG. 6 presents an illustrative example of selecting a dedicated server to add to a server configuration. In particular, four operational stages of the 605-620 of the multi-server control panel 100 are shown. These stages 605-620 are similar to the ones discussed above by reference to FIG. 2. However, instead of selecting the cloud server icon 235 in the object list 230, the user selects a dedicated server icon 605. Similar to the selection of an image as shown in FIG. 3, the user then selects an image containing an operating system for the dedicated server. When the user selects the next button 345, the user is presented with a dedicated server form 700, as illustrated in FIG. 7.

Figure 7:
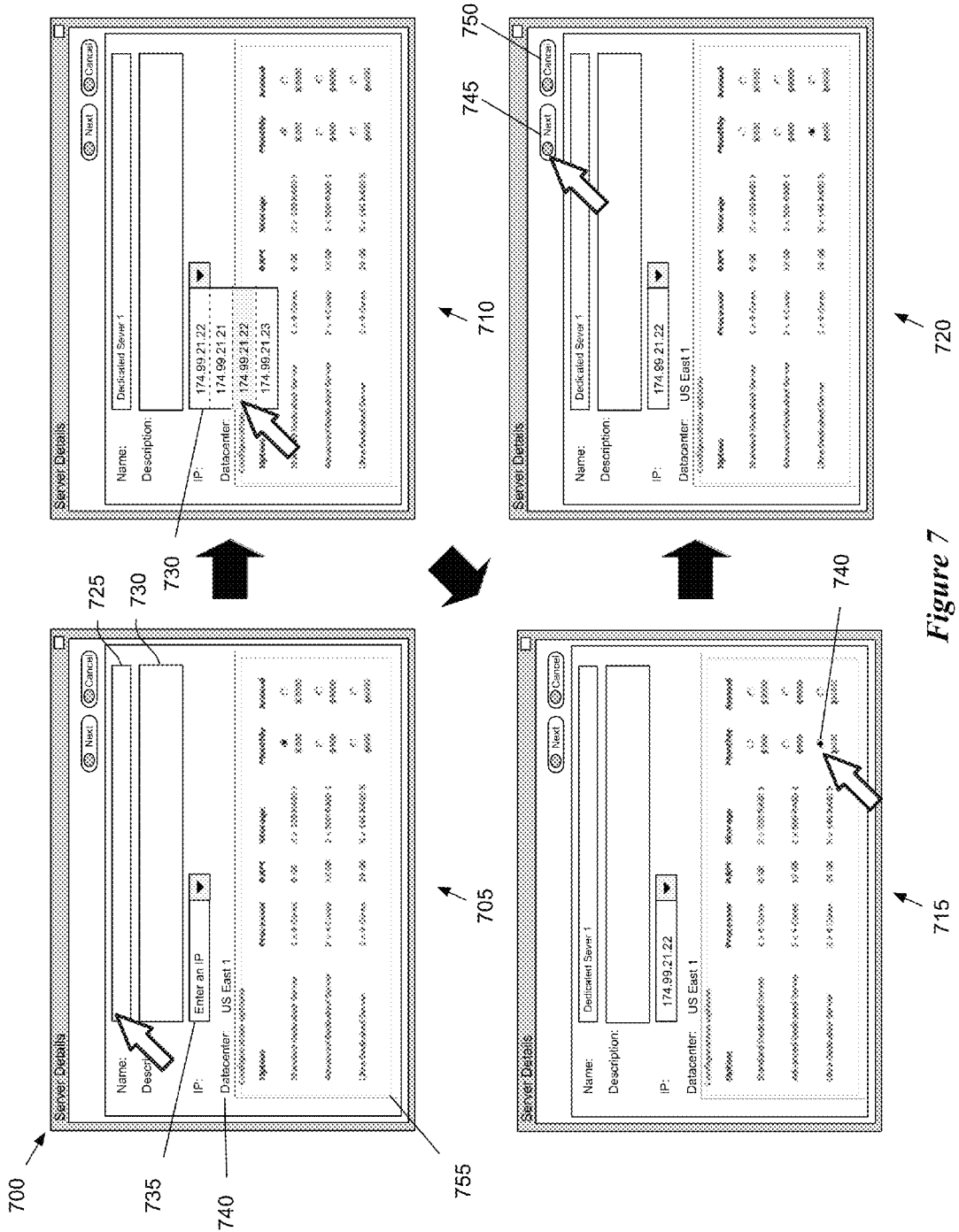
FIG. 7 provides an illustrative example of configuring a dedicated server.

FIG. 7 provides an illustrative example of configuring a dedicated server using the dedicated server form 700. Specifically, this figure shows four operational stages 705-720 in defining a dedicated server that will be added to the server configuration. However, before describing these stages, several elements of the dedicated server form 700 will be described. As shown, the dedicated server form 700 includes a name field 725, a description field 730, an IP address field 735, and a configuration list 755. The dedicated server form 700 also includes a datacenter label 740 indicating the selected datacenter as "US East 1".

The name field 725, description field 730, and IP address field are similar to those discussed above by reference to FIG. 4 with respect to the cloud server form 400. Specifically, the name field 725 allows the user to specify a descriptive name or site name for the dedicated server. The description field 730 is an optional field that allows the user to describe the dedicated server. The IP address field 730 allows the user to specify an IP address for the dedicated server.

The configuration list 755 allows the user to select or specify a hardware configuration for the dedicated server. Specifically, it lists several different configurations for the dedicated server based on processor, memory, and storage. For instance, a first configuration indicates that the dedicated server includes one multiple core processor, 8 GB of memory (i.e., RAM), and two 320 GB RAID storages. The first configuration also includes prices for monthly or annual plans. As shown, the configuration list 755 lists several other configurations including a second and third configuration with additional processor cores, memory, and storage.

Alternatively or conjunctively, other embodiments might allow the user to select from other resources in the configuration list 755. Examples of such other resources include hardware resources (such as manufacturer and type of CPU, CPU cycles, memory type, storage type, etc.) and network resources (such as data transfer). Different embodiments allow the user to specify the dedicated server configuration differently. For instance, instead of selecting a particular configuration from a list of configurations, some embodiments allow a user to customize a dedicated server by selecting different hardware components. This allows the user to more gradually define the dedicated server that will be added to the server configuration. In some embodiments, the configuration list 755 is implemented as a pull-down menu that opens to provide a list of selectable configurations from which the user can choose for the dedicated server.

Having described the elements of the dedicated server form 700, the operations of configuring a dedicated server will now be described by reference to the state of this form at the four stages 705-720. In the first stage 705, the datacenter field 740 indicates that the selected datacenter for the dedicated server is "US East 1". Also, selecting (e.g., through a cursor click operation, through a touch operation, etc.) the name field 725 allows the user to input a name for the dedicated server.

Stage two 710 shows the dedicated server form 700 after the user has specified a name for the dedicated server. Here, the IP address field 735 is selected to reveal a drop-down list of different IP addresses from which the user can choose an IP address. As the user scrolls through the list, the selected IP address is highlighted.

In stage three 715, the user selects a radio button 740 corresponding to the third configuration in the configuration list 755. As shown in the figure, the third configuration includes two multiple core processor, 24 GB of memory, and five 146 GB RAID storages. The fourth stage 720 shows the user's selection of the "Next" button 745 to proceed with configuring the dedicated server. In some embodiments, the user can cancel the process of adding the dedicated server at any time by selecting the "Cancel" button 750. When the user selects the next button 745, the user is presented with an image selection window 800, as illustrated in FIG. 8.

Figure 8:
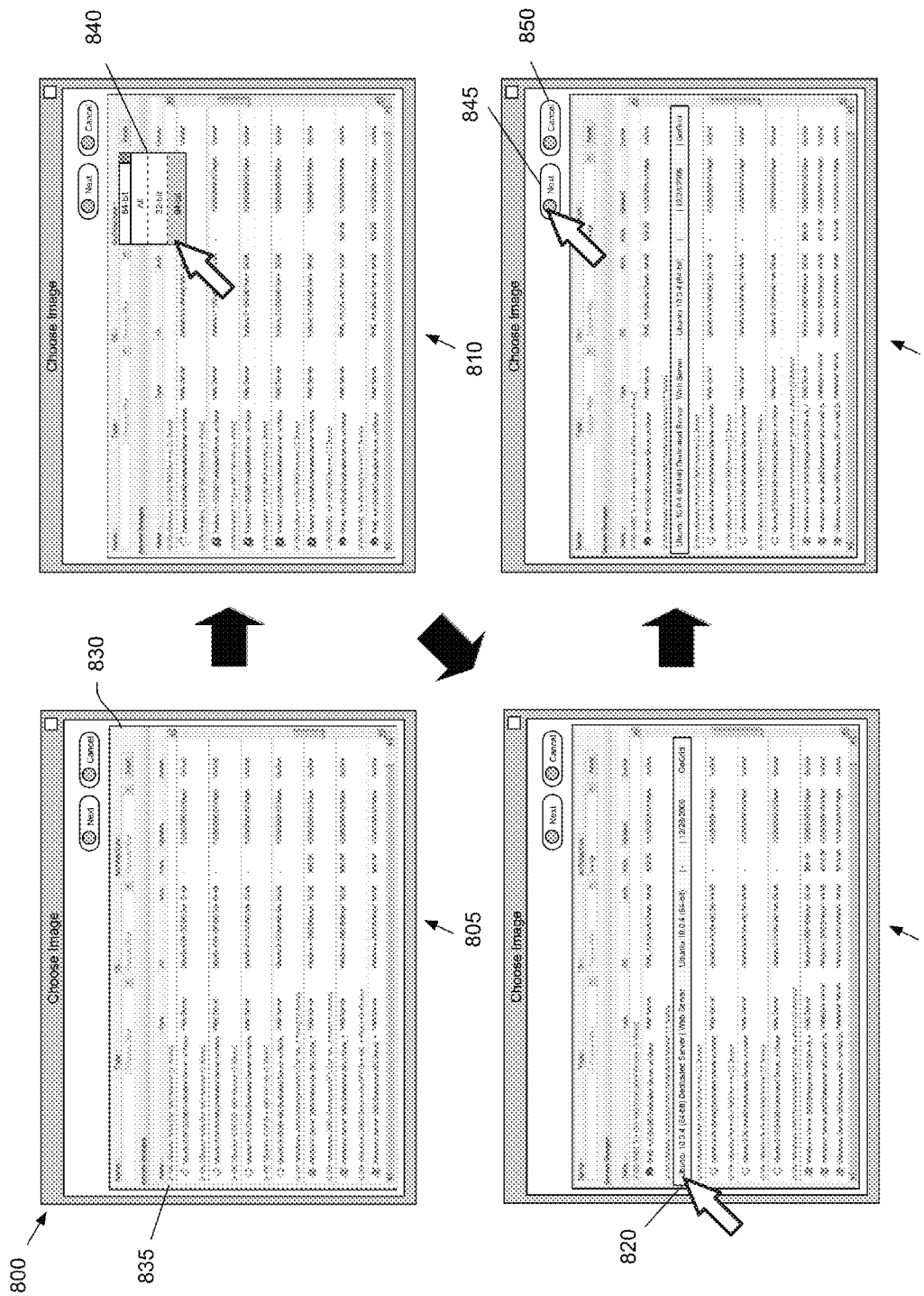
FIG. 8 presents an illustrative example of specifying an operating system for the dedicated server.

FIG. 8 presents an illustrative example of specifying an operating system for the dedicated server by using the image selection window 800. Specifically, this figure shows four operational stages 805-820 of selecting an image that includes the operating system. In some embodiments, an image is a copy of the entire state of an operating system. The image may contain just an operating system or the operating system preconfigured with one or more applications. In some embodiments, the images include operating systems with preconfigured web server applications that support dynamic web content. The operating system may also be preconfigured with web servers that include an application server or a web application framework such as Ruby on Rails.

In some embodiments, a dedicated server is defined as a web server, database server, or application server based on one or more applications that are installed or preconfigured on the operating system. For example, the dedicated server may be defined as a database server when an image selected for the server includes an operating system that is preconfigured with a database application (e.g., SQL server). Also, the dedicated server may be defined as a web server when an image having an operating system preconfigured with a web server or application server is selected as the server. Furthermore, the dedicated server may be defined by default as a dedicated server, application server, or database server when an operating system is not preconfigured with any application.

As shown in the first stage 805, the image selection window 800 includes an image list 835 and a filter tool 830. The image list 835 is an area in the window 800 that lists all available images from which the user can choose the selected dedicated server. In some embodiments, the list of images 835 represents images in one or more image repositories or libraries. The list 835 may include images provided by the hosting service. The list 835 may further include images provided by other users (e.g., customers, general public, etc). Alternatively, the list 835 may include only images provided by other users in some embodiments.

In the example illustrated in FIG. 8, several different selectable images are displayed. Several of these images include Linux distributions, while others include Windows® operating systems. The images are also classified as either a web server or a database server. Also, several of the listed images are only available for dedicated severs, and others are available for all types of servers. The list 835 may be sequentially organized by the name of the operating system, the type of server (e.g., web server, database server), the type of operating system, architecture (e.g., 32-bit, 64-bit), price, date updated, and owner.

In some embodiments, the images may also be organized or classified by system requirements. In other words, different images may have different system requirements. These requirements may include memory, storage, processor, etc. For instance, some images may be available for a dedicated server that has a minimum of one gigabyte of random access memory (RAM). Also, some images may support a maximum of sixteen gigabytes of RAM. As shown in the first stage 805, the list 835 is alphabetically organized by name based on a sorting tool.

The filter tool 830 is a user interface item provided in the image selection window 800 that allows the user to search or filter the image list 835 based on one or more criteria. In the example illustrated in FIG. 8, the user can filter the image list 835 based on the name of the operating system and architecture. The user can also filter the image list 835 based on different types of servers. For instance, the image list 335 may be filtered to only display images that are defined as a web server or database server. Also, the user can reset the filter tool 830 by selecting a reset button.

Having described the image selection window 800, the operations of selecting an image will now be described by reference to the state of this window at the four stages 805-820. In the first stage 805, the image list 835 lists several images from which the user can choose the dedicated server. The second stage 810 shows the user filtering the image list 835 based on the architecture of the operating system. Specifically, a field 840 of the filter tool 830 is selected to reveal a drop-down list of different architecture filters (i.e., 32-bit, 64-bit). The user chooses the 64-bit filter which causes the image list 835 to display only those operating systems matching the filter, as illustrated in the third stage 815.

In the third stage 815, as the user scrolls through the list of images 835, the selected image is highlighted. Here, the user selects an image containing a Linux operating system that is defined as a web server. The fourth stage 820 shows the user's selection of the "Next" button 845 to proceed with specifying an operating system for the dedicated server. In some embodiments, the user can cancel the process of specifying an operating system for the dedicated server by selecting the "Cancel" button 850.

In some embodiments, when the user selects the next button 845, the user is presented with a dialog window that inquires whether to proceed with provisioning the dedicated server. The dialog window may list the configuration settings (e.g., selected hardware, image, datacenter, etc.) for the dedicated server. The dialog window may also list hosting plan details (e.g., contract related, pricing, etc). In some embodiments, the dialog window includes an "accept" button to confirm the provisioning request and a "cancel" button to cancel the request.

Figure 9A:
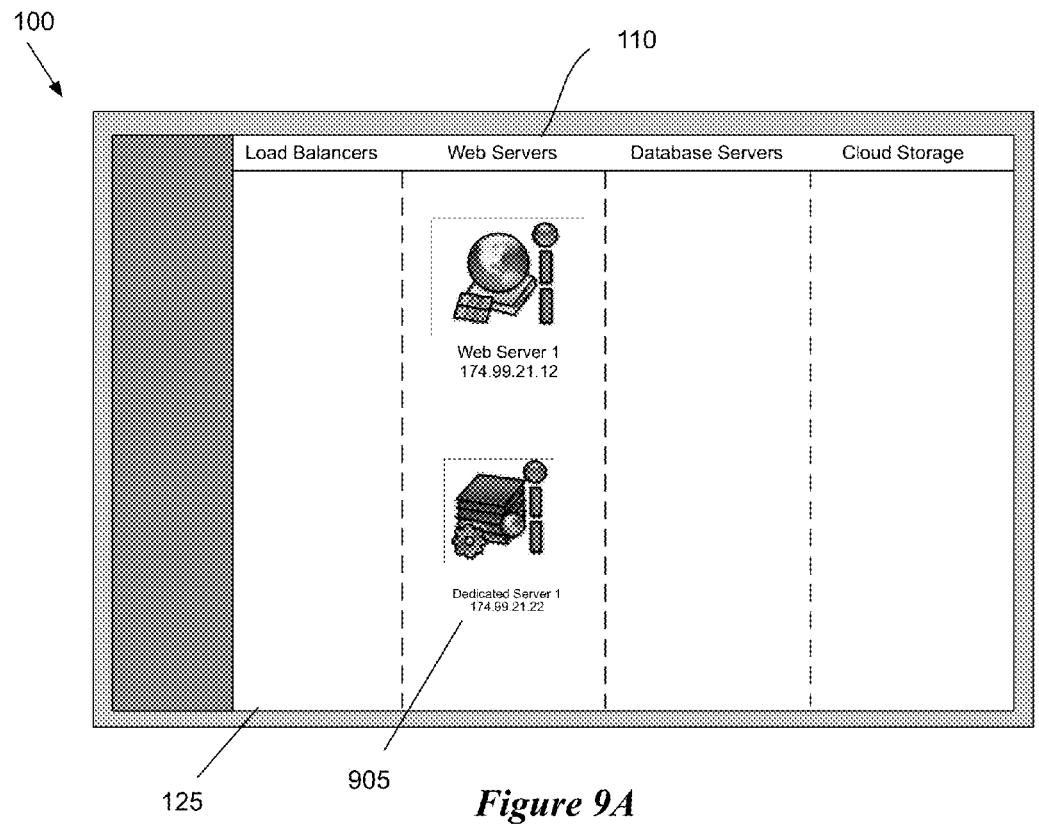
FIG. 9A illustrates the multi-server control panel displaying a dedicated server representation.

FIG. 9A illustrates the display area 125 of the multi-server control panel 100 after the user selects an image containing an operating system from the image selection window 800 and selects the "Next" button 845 on this form. The selection of the "Next" button 845 causes the front-end logic to define the dedicated server to add a graphical representation 905 of this dedicated server to the web server tier 110 that is displayed in the display area 125. Alternatively, some embodiments include a commit button. Once the user has specified the dedicated server configuration, the user can select this commit button (e.g., by clicking on this button) to direct the back-end deployment manager to deploy the dedicated server configuration. Once a user has specified a configuration, the hosting system identifies the specified datacenter location and deploys the dedicated server in real-time at the identified location. Several examples of automatically deploying the dedicated server will be described below by reference to FIGS. 12-17.

Figure 9B:
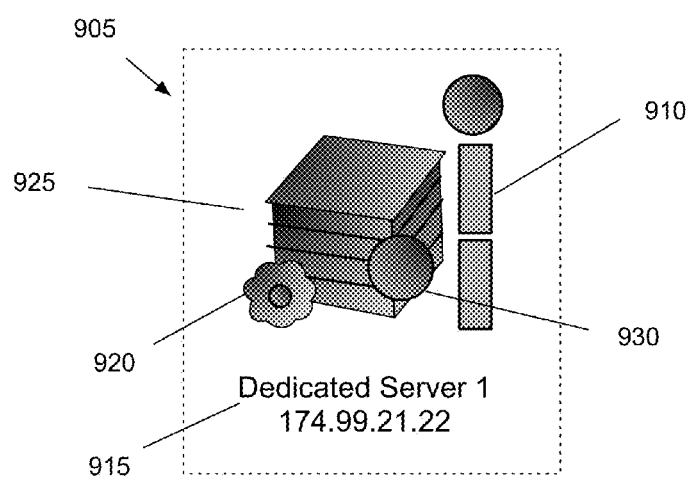
FIG. 9B provides a close-up view of the dedicated server representation.

FIG. 9B provides a close-up view of an example dedicated server representation of the multi-server control panel 100. In this example, the dedicated server representation 905 has a textual element 915 and a graphical element 925. The textual element 915 identifies the dedicated server as "Dedicated Server 1". The textual element 915 of some embodiments identifies the dedicated server by a specified hostname. For instance, if the user specifies the hostname (e.g., "www.abc.com") through the name field 425 of the cloud server form 400, then the display area might display the specified name. In the example illustrated in FIG. 9B, the textual element includes an IP address of the dedicated server.

The graphical element 925 includes a dedicated server icon 920 and a resource meter 910. The dedicated server icon 920 is a graphical representation of the dedicated server. In some embodiments, the dedicated server icon 920 provides an indication of the operating system installed on the dedicated server. For instance, if the user selects an operating system image that includes a particular Windows operating system, the dedicated server icon 920 may display a representation of the particular operating system. As shown in FIG. 9B, the dedicated server icon 920 displays an indication that the operating system selected for the dedicated server is a Linux distribution.

The resource meter 910 is a meter that displays usage of several resources (e.g., CPU and memory) in real-time. In the example illustrated in FIG. 9B, the top resource meter represents CPU usage, and the bottom resource meter represent memory usage. Each meter displays the real-time usage by fluctuating (e.g., moving a bar within the meter) in accord with the real-time usage of the corresponding resource by the server. In some embodiments, the fluctuating graphical display is indicative of usage of the resource at different instances in time and/or is indicative of real-time or near-real time usage of the resource.

Also, the fluctuating graphical display changes color in some embodiments when the usage of the particular resource exceeds a particular threshold. For instance, in some embodiments, the bar within a meter changes color when resource usage goes over a predetermined threshold for the resource. One such example is when the memory usage exceeds 50 percent of an allotted memory capacity, the bottom resource meter might change from one color to another color (e.g., from green to yellow).

The threshold in some embodiments is an expected usage rate over a duration of time based on the amount of a particular resource that is assigned to the particular user. Hence, the top and bottom meters can indicate different colors at different instances in time to specify excess usage of the resource. These fluctuating meter bars and the changing colors provide a quick visual indication of whether the CPU and memory are being overloaded or "thrashed." Hence, these icons are referred to as "thrash-o-meters" in some embodiments. Instead of or in conjunction with the CPU and memory, some embodiments of the multi-server control panel provide real-time usage information of other resources. These other resources include network resources (e.g., network traffic, data transfer) and other physical resources (e.g., storage space).

II. Architecture

Figure 10:
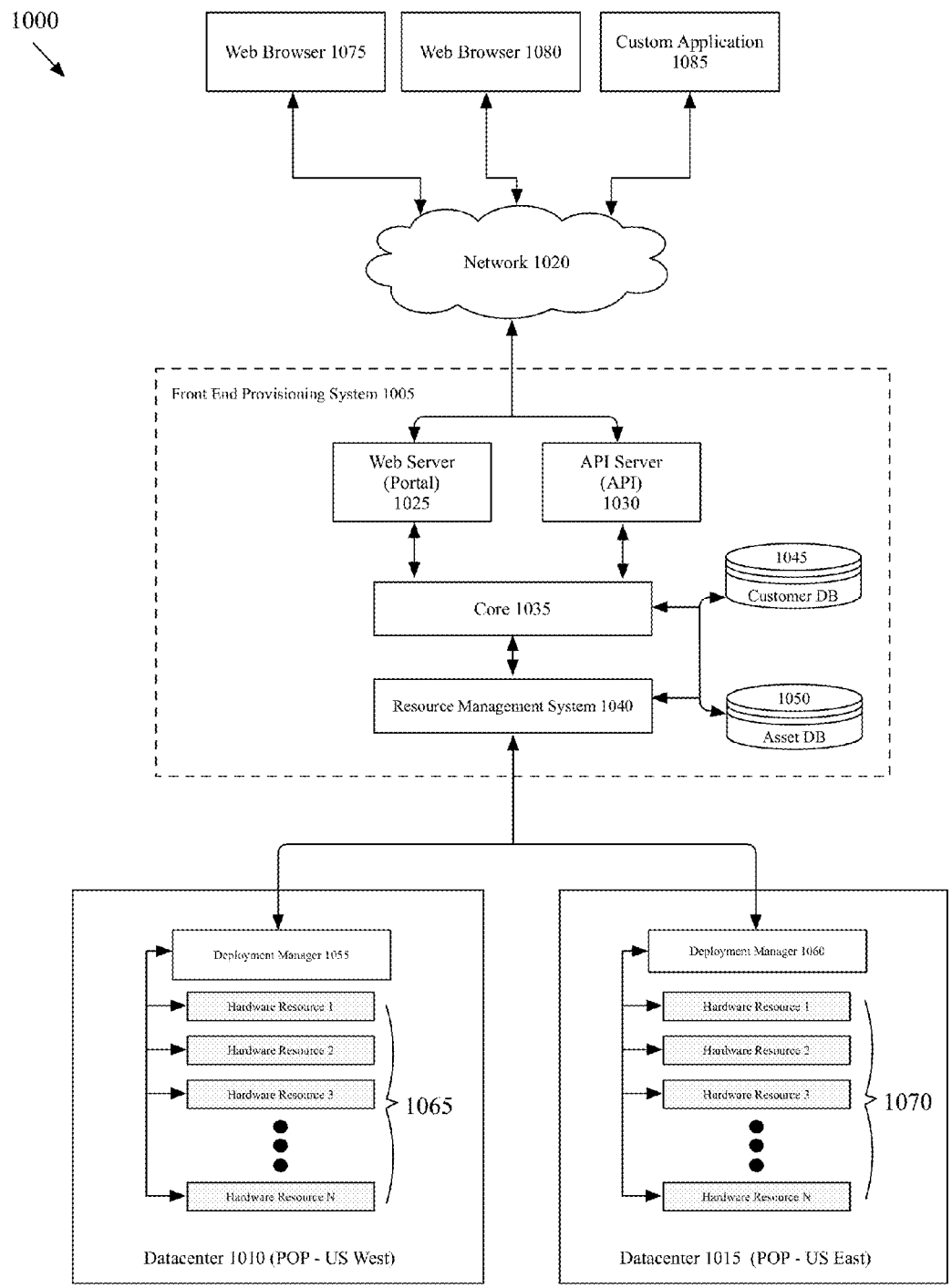
FIG. 10 illustrates a hosting system that implements some embodiments of the invention.

FIG. 10 illustrates a hosting system 1000 that implements some embodiments of the invention. This system provides automated reception of server configurations (e.g., for dedicated servers, virtual servers, etc.) through front-end user interface (UI) logic, and automated deployment of server configurations through back-end logic. The system may also receive different provisioning tasks (e.g., restart request, shutdown request, scale request) through the front-end UI and fulfill these tasks through the back-end logic. In some embodiments, the back-end logic is implemented using one or more deployment managers that operate at a particular datacenter. As shown in FIG. 10, the hosting system 1000 includes a front-end provisioning system 1005 that is communicatively coupled to datacenters 1010 and 1015 through deployment managers 1055 and 1060.

The front-end provisioning system 1005 (1) receives communications (e.g., service requests) from external users through a network 1020 and (2) routes the communications to different datacenters (e.g., datacenters 1010 and 1015). In the example illustrated in FIG. 10, the front-end provisioning system 1005 includes a web server 1025, an application programming interface (API) server 1030, a core 1035, and a resource management system 1040.

The web server 1025 communicates to a user through a network 1020 such as the Internet. Specifically, the user accesses the hosting system 1000 through the web browser 1075 or 1080 which may be executed on the user's desktop computer, portable notebook computer, personal digital assistant (PDA), digital cellular telephone, or other electronic communication devices. For instance, when the user logs onto the hosting service's website or portal, the user may be presented with the multi-server control panel as discussed above by reference to FIG. 1.

In some embodiments, the web-server 1025 is responsible for generating a graphical interface through which users specify graphical representations (e.g., the multi-server control described in Section I above) for various server configurations. In conjunction with or instead of the web server, some embodiments implement the API server 1030 that interfaces with different custom applications (e.g., a custom application UI 1085) through the network 1020. The custom applications may operate on different operating systems or communication devices. In some embodiments, the custom application may be a program or an applet that executes in a web browser.

In some embodiments, the core 1035 acts as a controller that contains the executable code or logic required to perform different operations related to the multi-server control panel. These operations may include operations related to creating user accounts, enforcing access privileges (e.g., authenticating and authorizing a user), billing, monitoring resources, etc. For instance, on an initial communication, the web server may pass the user communication to the core for user verification and authentication. Accordingly, the core may receive identification information from the user and determine whether the user has already created an account with the system. Also, the core 1035 may authenticate and authorize the user based on data stored in the customer database 1045. In addition, the core may utilize an asset database 1050 to track available resources (e.g., hardware resources). In some embodiments, the core 1035 interacts with the resource management system 1040 to facilitate management of servers (e.g., virtual servers, dedicated servers) at different datacenters.

The resource management system 1040 receives different requests (e.g., provisioning tasks, restart request) from the core 1035 and routes these requests to the back-end provisioning system. In some embodiments, the resource management system 1040 (1) receives a change request from the core 1035, (2) identifies a particular deployment manager that can fulfill the change request, and (3) sends a message to the particular deployment manager. The resource management system 1040 may also identify a datacenter location from the change request. For instance, the resource management system 1040 may receive a request for a virtual server at a datacenter located in the Eastern United States. The resource management system 1040 may then send a message to a deployment manager that deploys virtual severs at the datacenter location.

The resource management system 1040 may serialize a message or data structure into a format that is understandable by a deployment manager that operates at a particular datacenter. In some embodiments, the serialization allows objects or data structures containing information to be sent and understood by different parts or modules of the provisioning system (e.g., the front-end provisioning system, the back-end provisioning system). For instance, different modules of the provisioning system that are defined by different programming languages (e.g., C++, Java, etc.) may interoperate by exchanging messages that are serialized.

The deployment manager (e.g., 1055 or 1060) is a component of the back-end system that receives a request (e.g., provisioning task) and translates the request to control or manage hardware resources such as hardware nodes, dedicated machines, storage area networks, etc. Each datacenter location (e.g., datacenter 1010 or 1015) may have one or more deployment managers for different tasks. For instance, a datacenter may have one deployment manager that deploys virtual machines and another deployment manager that deploys dedicated machines. The datacenters may also have one or more other deployment managers to monitor or control (e.g., restart, shutdown) hardware resources.

Figure 11:
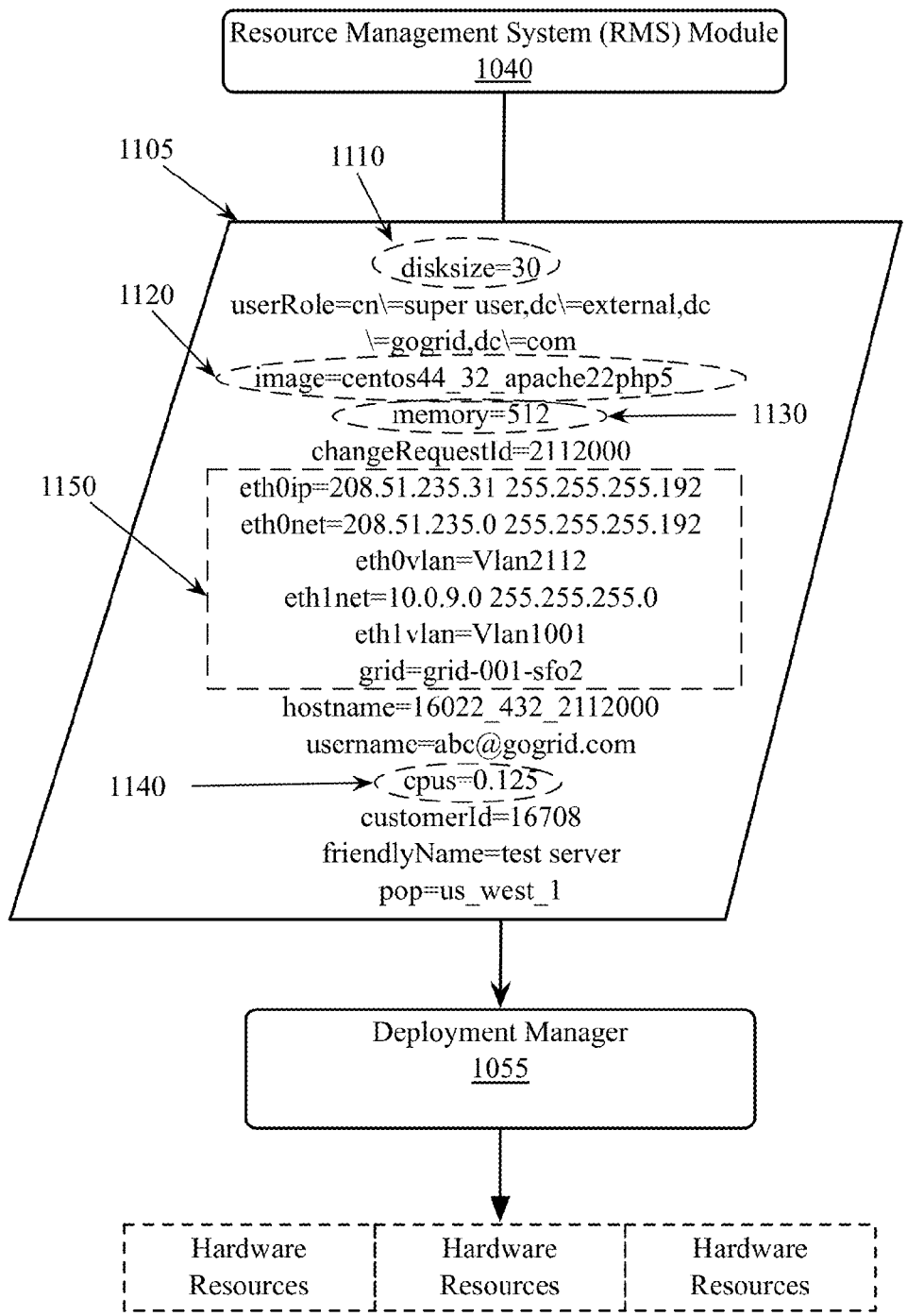
FIG. 11 illustrates a message that is sent from the resource management system to the deployment manager of some embodiments.

FIG. 11 illustrates a message 1105 (e.g., a change request) that is sent from the resource management system 1040 to the deployment manager 1055. Specifically, the message includes an example sever configuration to automatically deploy a virtual server on a particular hardware node at a particular datacenter. To facilitate the automatic deployment of the virtual server, several different parameters are sent to the deployment manager 1055. As shown, the message includes (1) a first parameter 1110 specifying the amount of storage space for the virtual server, (2) a second parameter 1120 indicating an operating system image with a preconfigured web server, (3) a third parameter 1130 specifying the amount of memory to allocate for the virtual server, and (4) a fourth parameter 1140 indicating a particular processor for the virtual server.

To configure network details for the virtual server, the message 1105 includes several other parameters 1150. As shown, the message 1105 includes an "eth0vlan" parameter that represents a customer's VLAN identify for the public network and an "eth1vlan" parameter that represents the customer's VLAN identify for the private network. In the example illustrated in FIG. 11, the message 1105 also includes an "eth0net" parameter that defines the subnet and submask of "eth0vlan", and an "eth1net" parameter that defines the subnet and submask of "eth1vlan". Also, the message 1105 includes an "eth0ip" parameter that defines the IP subnet and submask for the pubic network.

In some embodiments, the deployment manager 1055 receives the message 1105 and facilitates deployment of the virtual server according to the server configuration. Different embodiments deploy virtual servers differently. For example, the deployment manager 1055 may operate in conjunction with a scheduler to schedule and deploy the virtual server on an available hardware node. Also, the deployment manager 1055 may operate in conjunction with one or more other network components or modules (e.g., switch programs) in order to define the public and private VLANs for the virtual server according to the network details described above.

Having described the example architectural components of the hosting system, several example network components will be described in Sections III and IV below. Specifically, Section III describes an example configuration of the hosting system to provide virtual grids of hardware resources. Section IV then describes an example configuration of the hosting system to provide grid-independent hardware nodes.

III. Virtual Grids

As mentioned above, the VLAN protocol (e.g., 802.1Q) specifies a VLAN identification (ID) that includes 12 bits of data. This limits the maximum number of unique VLAN IDs to around 4096 (2^12) per grid. Due to this limitation of the VLAN protocol (e.g., 802.1Q), some hosting service providers organize hardware resources (e.g., hardware nodes, dedicated servers) into different grids of physical grids in order to provision and manage server configurations of multiple different entities (e.g., customers, users). In other words, the service providers are forced to organize their hardware resources into different physical grids when all available VLAN IDs are utilized. However, as the hosting service providers serve more and more entities, the limitations of this organization make further growth expensive and difficult to manage.

Figure 12:
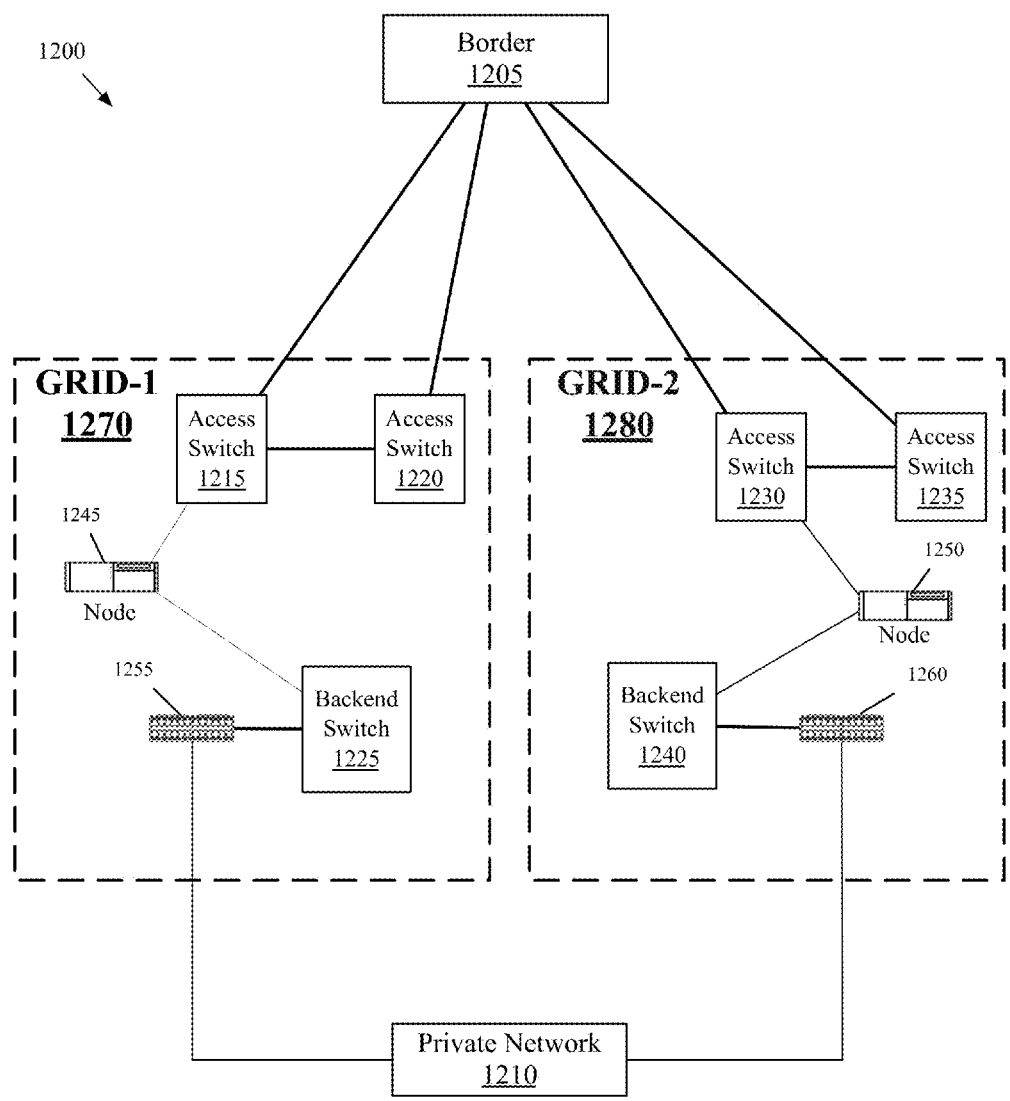
FIG. 12 illustrates an example network architecture using different physical grids.

FIG. 12 illustrates an example network architecture that a hosting system 1200 utilizes to organize hardware resources into different physical grids. Specifically, this figure illustrates many limitations caused by partitioning hardware resources into different physical grids. As shown, the hosting system 1200 includes two physical grids 1270 and 1280. Each of these grids 1270 and 1280 provides access to or connects to both a public network and a private network 1210. Each physical grid provides access to the public network via a border 1205.

As shown in FIG. 12, Grid-1 1270 includes two access switches 1215 and 1220, one backend switch 1225, a set of hardware nodes 1245, and a top-of-rack switch 1255. Similarly, Grid-2 1280 includes two access switches 1230 and 1235, one backend switch 1240, a set of hardware nodes 1250, and a top-of-rack switch 1260. As each grid includes its own set of hardware resources and switches, Grid-1 1270 and Grid-2 1280 are two separate switched networks.

In the example illustrated in FIG. 12, each customer's server has access to the public network and private network. Here, the public network is configured with one or more public Internet Protocol (IP) addresses. This allows the server on the network of a particular grid to be visible to devices outside of the network (e.g., from the Internet or another network). On the other hand, the private network is configured such that the devices outside of the network cannot access the customer' server. This private network 1210 defines different broadcast domains for different customers using unique VLAN IDs. For example, by assigning one or more matching VLAN IDs for servers (e.g., virtual server, dedicated server) of one customer, the customer's servers can communicate with one another through the private network.

The access switches 1215, 1220, 1230, and 1235 perform routing and switching operations to provide access to public networks. The backend switches 1225 and 1240, as well as the top-of-rack switches 1255 and 1260, are for switching data to the private network 1210. In the example of FIG. 12, the access switch (1215, 1220, 1230, or 1235) and the backend switch (1225 or 1240) represents industrial switches (e.g., a same type of industrial switch). Because of the large amount of routing tasks involved and relative weak routing capacities on these industrial switches, each grid includes multiple access switches (e.g., to provide the public interface to Internet via the border 1205).

The sets of hardware nodes 1245 and 1250 represent hardware resources that can be shared amongst multiple different customers. Each set of hardware nodes (1245 and 1250) is coupled to the corresponding back end switch (1225 and 1240) so that a customer's servers can communicate with one another over the private network. Here, each set of hardware nodes connects to network switches that are located within the same grid. As such, each set of hardware nodes is tied to a particular grid and cannot be used for another grid. For example, the set of hardware nodes 1245 can only be associated with VLANs in Grid-1 1270.

There are several problems with the grid architecture illustrated in FIG. 12. For example, due to VLAN protocol limitations, the number of unique VLAN IDs can be exhausted in both Grid-1 1270 and Grid-11280. For example, a customer's server can be assigned a public VLAN ID and a private VLAN ID. This limits the number of different customers to around 2000 (e.g., 4096/2) per grid. When the maximum number is reached in both grids, the hosting system 1200 has to provide a new physical grid with another set of switches and hardware nodes.

Accordingly, this method of scaling the hosting system 1200 is quite expensive to manage. It is also cumbersome to manage resources for multiple grids separately. For example, the set of hardware nodes (e.g., 1245) in Grid-1 1270 cannot be utilized for customers assigned to Grid-2 1280. With each additional grid, the capacity requirements multiply, as separate pools of hardware nodes need to be maintained for each grid. When hardware nodes need to be moved between grids, these nodes have to be physically moved from one area of the datacenter to another area of the datacenter.

Moreover, in the example illustrated in FIG. 12, there are several single points of failure. For instance, each switch (e.g., access switches 1215 and 1220, and backend switch 1225) is a single point of failure. In some cases, the failure of one of these switches will potentially affect many customers (e.g., thousands of customers) as it will cause a communication failure to the set of nodes that is connected to that switch. Having so many single points of failure can be potentially revenue-affecting for a hosting service provider. Furthermore, it is expensive to deploy a separate set of switches (e.g., industrial switches) for each grid. It is also expensive to maintain a separate pool of hardware nodes for each grid. Furthermore, moving hardware nodes between grids is labor-intensive and potentially costly.

Figure 13:
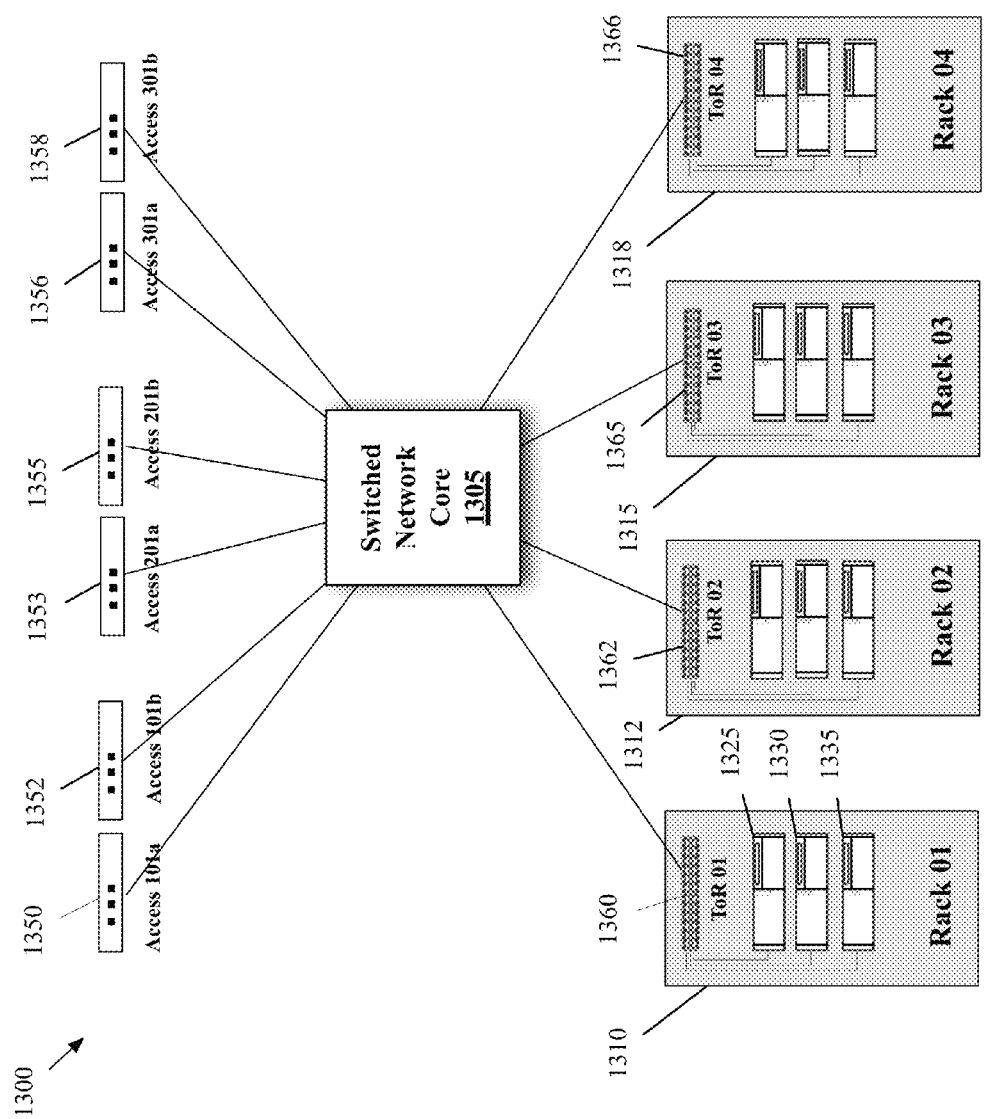
FIG. 13 illustrates an example network architecture of some embodiments of the invention.

FIG. 13 illustrates an example network architecture according to some embodiments of the invention. In particular, this is a network architecture for a hosting system 1300 that scales routing and switching independently of one another. By separating the routing and switching layers, the hosting system 1300 is able to scale routing and switching independently of each other in one switched network. As illustrated in FIG. 13, the hosting system 1300 includes a switched network core 1305, several routers 1350-1358, and several hardware racks 1310-1318. Each hardware rack has one or more top-of-rack switches, e.g., 1360, and several hardware nodes, e.g., 1325-1335.

The switched network core 1305 is a set of core switches that manage data communication for all grids. The set of routers 1350-1358 are for routing traffic to the Internet. Each router is configured to serve one or more grid. In this example, routers 1350 and 1352 are configured to serve grid 101, routers 1353 and 1355 are configured to serve grid 201, and routers 1356 and 1358 are configured to serve grid 301. If the demand for routing increases, the hosting system 1300 can simply add additional routers to meet the increased demand.

The set of hardware racks 1310-1318 are standardized enclosures for mounting multiple hardware resources. Each hardware rack has several hardware nodes and one or more top-of-rack switch. For instance, hardware rack 1310 has three hardware nodes 1325-1335 and one top-of-rack switch 1360. The top-of-rack switch 1360 is an inexpensive switch that sits on the very top or near the top of a hardware rack in a data center. The top-of-rack switch 1360 switches data to different grids for hardware nodes 1325-1335. As the demand for hardware resources increases and more hardware racks are added, the hosting system 1300 can simply add additional top-of-rack switches to meet the increased demand.

The hosting system 1300 organizes hardware resources into logical (or virtual) grids rather than physical grids. Accordingly, the same switching infrastructure can be leveraged for multiple grids. Instead of having three expensive switches for each physical grid as illustrated in FIG. 12, the hosting system 1300 uses a single set of switches and routers to manage switching and routing for multiple virtual grids. In addition, the hosting system 1300 can scale well beyond 4K VLANs on the same switched network infrastructure, as will be described below by reference to FIGS. 14 and 15.

Because the routing and switching are scaled independently, the hosting system 1300 can scale the routing and switching infrastructure without any significant limits from the other. The hosting system 1300 can also scale the switched network linearly in a cost effective manner as the number of customers increases and without requiring any significant upfront deployment expenses.

Rather than using the same switch for both routing and switching, as described in FIG. 12, the hosting system 1300 uses specialized routers and switches for routing and switching, respectively. This improves the routing and switching performance. The hosting system 1300 does not have to deploy a whole new switch just to scale routing resources. As a result, the hosting system 1300 can add routing resources in a more cost effective and architecturally simpler manner. In addition, by using multiple inexpensive routers and switches in a single switched network, the hosting system 1300 increases its availability by significantly reducing and isolating any potential outages.

In the example network architecture illustrated in FIG. 13, each hardware node is tied to a particular virtual grid, which is actually a set of VLANs. All nodes are connected in a single switched network. The design is flexible and extensible, such that the hosting system 1300 is able to deploy any customer on any node.

Figure 14:
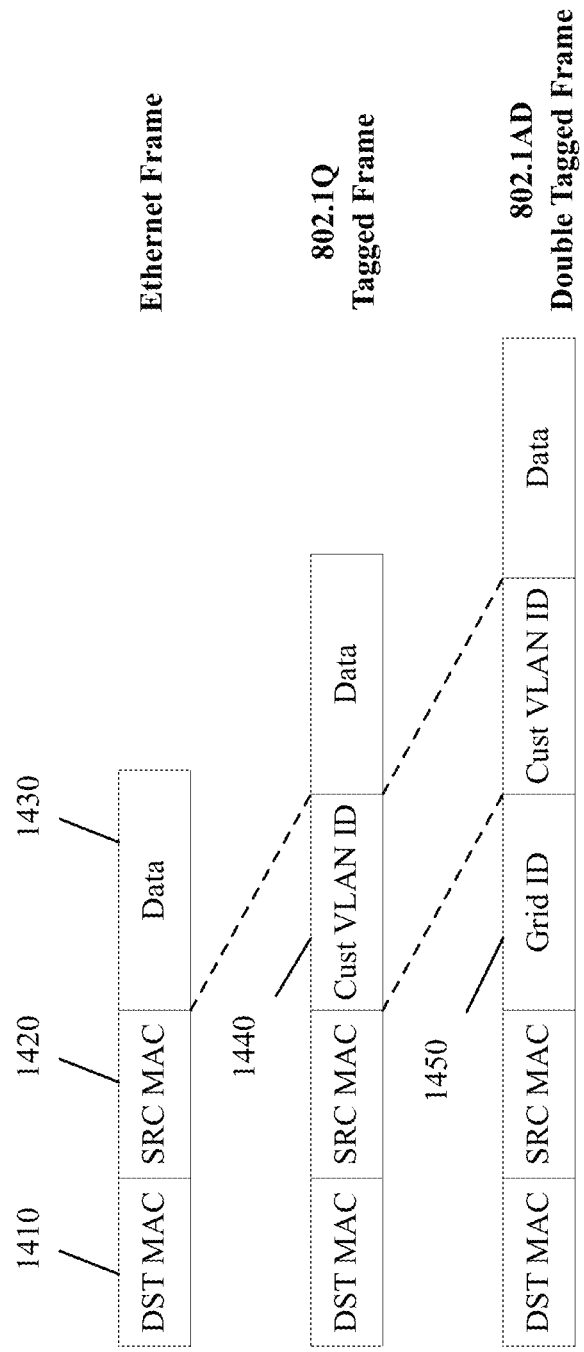
FIG. 14 illustrates an example of identifying logical grids in a hosting system of some embodiments of the invention.

In order to scale beyond 4K VLANs on a single switching infrastructure, the hosting system has to adopt a new VLAN protocol that provides extra bits for identifying virtual grids. FIG. 14 illustrates an example of using 802.1QinQ protocol to identify logical grids in a hosting system.

As illustrated in FIG. 14, an Ethernet frame is mainly constituted of three parts: destination MAC address 1410, source MAC address 1420, and data 1430. Current VLAN protocol (e.g., 802.1Q) inserts a customer VLAN ID 1440 into an Ethernet frame. However, current VLAN protocol has its limitations. For instance, 802.1Q frames only reserve 12 bits of data for VLAN IDs. This limits the maximum number of unique VLAN IDs to around 4096 per grid. A new VLAN protocol like 802.1QinQ (802.1AD) allows an outer VLAN tag 1450 to be inserted into an 802.1Q frame to serve as grid identification (ID) for virtual grids. This essentially allows support for 4096×4096 or 16,777,216 VLANs.

By using a new VLAN protocol like 802.1QinQ, the hosting system still divides hardware resources into grids. However, these grids are no longer physical grids as they used to be. Instead, grids are "virtual" now because they are purely logical. The division of hardware resources into grids has nothing to do with where they are located or which switch they connect to. The hosting service provider configures the switch port to which a particular node connects, and that will determine which virtual gird that particular hardware node belongs to.

The hosting system can leverage a new VLAN protocol like 802.1QinQ to segregate each virtual grid's VLANs. The separation of routing and switching layers allows the hosting system to do this. Each virtual grid can be assigned a different grid ID in the outer VLAN tag 1450. The routers, hardware nodes, and load balancers establish 802.1Q trunks just as they do in the past. However, on the switches, instead of configuring 802.1Q trunks, the hosting system configures 802.1QinQ tunnel ports. VLAN-tagged 802.1Q frames entering 802.1QinQ tunnel ports on the switch get an additional outer tag 1450. Frames exiting 802.1QinQ tunnel ports have the outer tag 1450 removed and the frames are sent with a single VLAN tag 1440 that represents the customer VLAN ID. The outer VLAN tag 1450 represents the grid and the inner VLAN tag 1440 represents the customer. While the invention has been described with reference to 802.1QinQ protocol, one of ordinary skill in the art will recognize that the invention can be embodied in other network protocols, e.g., 802.1AH (Mac-in-Mac), without departing from the spirit of the invention.

Figure 15:
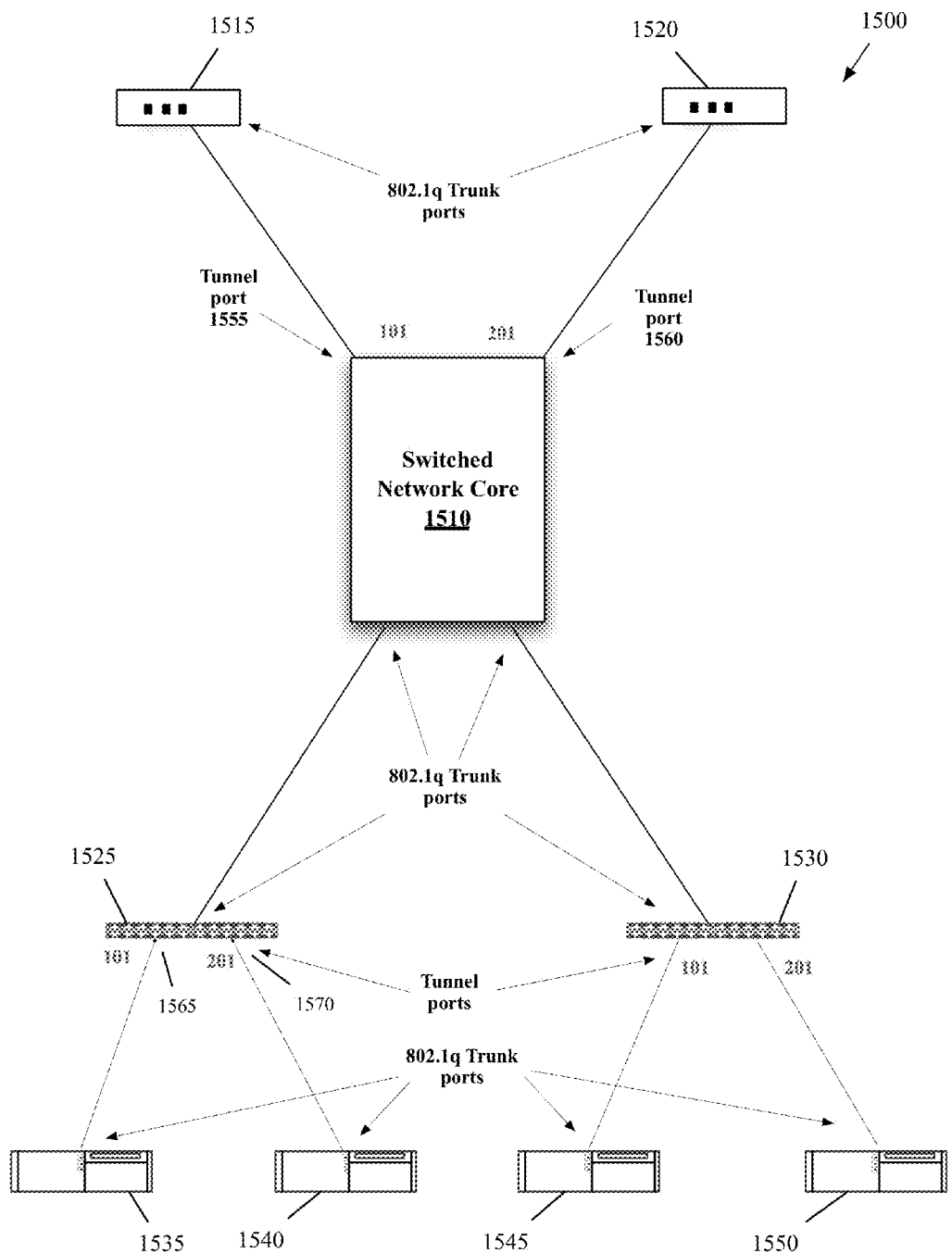
FIG. 15 illustrates an example hosting system that segregates traffic from different logical grids on the same switching infrastructure.

FIG. 15 provides a high level view of how traffic from different grids can be segregated on the same switching infrastructure. Specifically, this figure shows an example hosting system 1500 that configures 802.1QinQ tunnel ports on the switches to assign hardware nodes to different virtual grids. As shown in FIG. 15, the hosting system 1500 includes a switched network core 1510, two routers 1515 and 1520, two top-of-rack switches 1525 and 1530, and four hardware nodes 1535-1550.

The switched network core 1510 is a set of core switches that manage data communication for all virtual grids. The routers 1515 and 1520 are for routing traffic to the Internet. Each router is configured to server one or more virtual grids. In this example, router 1515 is configured to serve grid 101 by connecting to tunnel port 1555. Router 1520 is configured to serve grid 201 by connecting to tunnel port 1560.

The top-of-rack switches 1525 and 1530 switch traffic to different virtual grids for hardware nodes 1535-1550. Hardware nodes 1535-1550 represents physical resources (e.g., memory, storage, CPU, etc.) that can be shared amongst different customers. These hardware nodes connect to switches so that they can communicate with other entities in the switched network. The hosting system 1500 configures the switch port connecting a hardware node to assign the hardware node to a particular virtual grid. In the example illustrated in FIG. 15, for instance, since hardware node 1535 connects to switch 1525 through a tunnel port 1565 that is configured for grid 101, hardware node 1535 can only provide its hardware resources to VLANs in grid 101. Similarly, since hardware node 1540 connects to switch 1525 through a tunnel port 1570 that is configured for grid 201, hardware node 1540 belongs to grid 201.

By configuring 802.1QinQ tunnel ports on the switches, the hosting system 1500 is able to segregate traffic from different grids on the same switching infrastructure. Single-VLAN-tagged frames entering 802.1QinQ tunnel ports on the switch get an additional outer tag to identify the grid. Frames exiting 802.1QinQ tunnel ports have the outer tag removed and the frames are sent with a single VLAN tag that identifies the customer. The outer VLAN tag represents the grid and the inner VLAN tag represents the customer.

For example, frames entering the switch from router 1515 will get an outer tag of 101 to indicate they belong to grid 101. Among these frames, those destined for hardware node 1535 will go through the switched network core 1510 and the top-of-rack switch 1525, and will exit the switch 1525 through tunnel port 1565. When exiting tunnel port 1565, the outer grid tag of 101 will be removed and the frames will be sent to hardware node 1535 with a single VLAN tag that identifies the customer.

Even though a hardware node is tied to a logical grid in the hosting system 1500, it provides benefits over a hosting system in which each hardware node is tied to a physical grid. In a hosting system where a hardware node is tied to a physical grid, for example, if a node has to be moved between physical grids, it has to be unplugged, un-racked, moved to another area of the datacenter, and racked again. However, the hosting system 1500 adopts a network architecture of virtual grids instead of physical grids. As a result, all the hosting service provider needs to do is change the 802.1QinQ tunnel access VLAN ID on the switch to move a hardware node from one grid to another. Instead of physical separation between the grids, the hosting system 1500 has a logical separation. Significant cost savings can be realized, as the same switching infrastructure can be leveraged for all grids in a datacenter. There would be no need to deploy three expensive switches per grid, as described in FIG. 12 above. Instead, two equivalent switches will probably be able to serve all the grids in the hosting system 1500. Switching scales simply by addition of top-of-rack switches as more racks are added.

Figure 16:
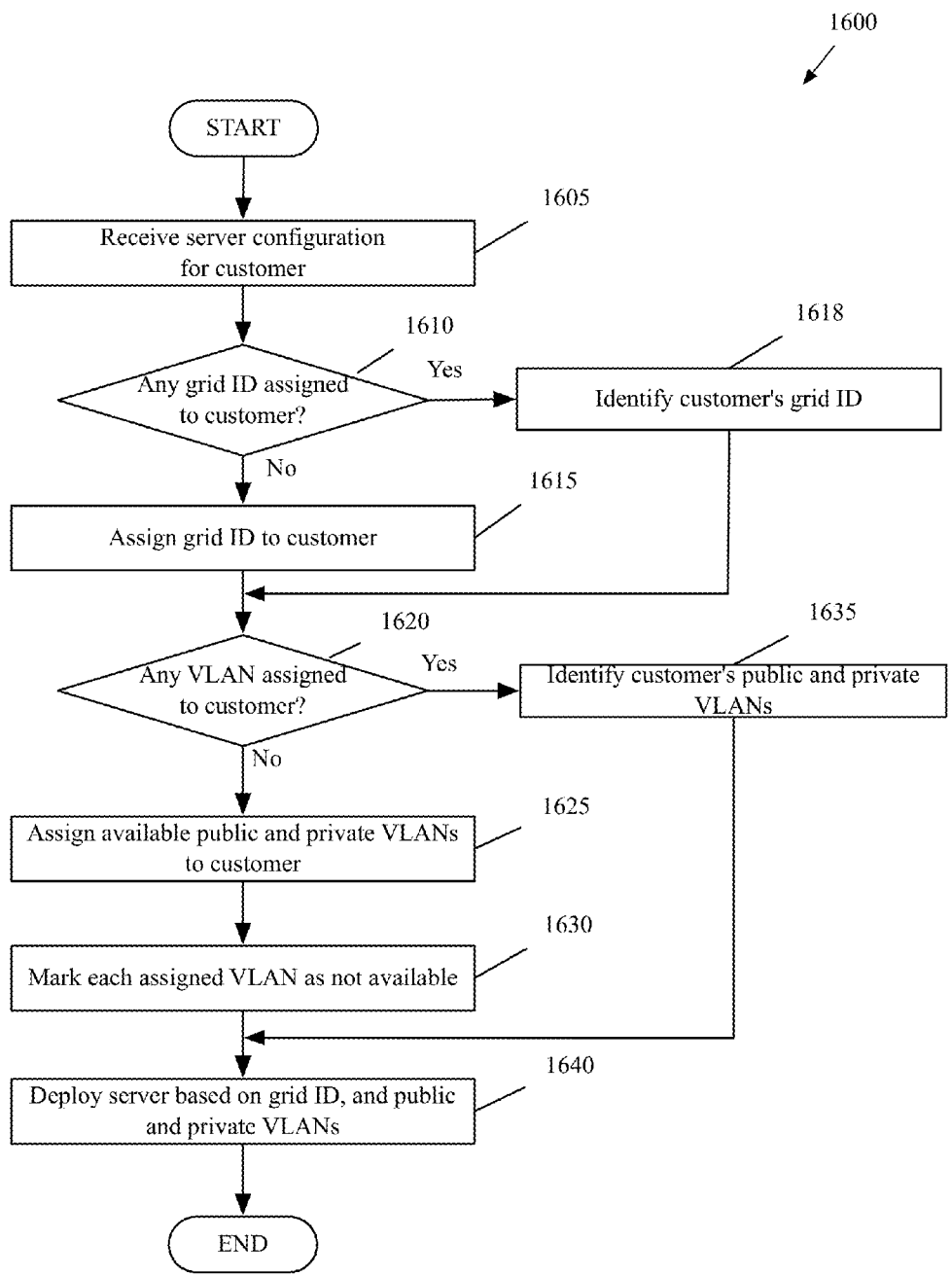
FIG. 16 conceptually illustrates a process for provisioning a virtual server on a hardware node in some embodiments of the invention.

For a hosting system, FIG. 16 conceptually illustrates a process 1600 for provisioning a virtual server on a hardware node. Specifically, this figure illustrates defining a public and private network for a customer's server based on several VLAN identities and grid identity. In some embodiments, the process 1600 is performed by one or more components of the hosting system (e.g., the core, the resource management system, the deployment manager).

The process 1600 first receives (at 1605) a server configuration for a customer. The process then determines (at 1610) whether there is a grid ID assigned to the customer. In some embodiments, the process 1600 performs this task by querying the customer database 1045 and/or the asset database 1050. When there is no grid ID assigned to the customer, the process assigns (at 1615) a grid ID to the customer. When the customer has been previously assigned a grid ID, the process identifies (at 1618) this grid ID.

The process 1600 then determines (at 1620) whether there is any VLAN assigned to the customer. In some embodiments, the process 1600 performs this task by querying the customer database 1045 and/or the asset database 1050. When there is no VLAN assigned to the customer, the process 1600 assigns (at 1625) available VLANs for the server's public and private networks.

The process then marks (at 1630) each assigned VLAN as not available. In some embodiments, the process 1600 performs the marking by modifying the contents in the customer database 1045 and/or the asset database 1050. This is to prevent the same VLAN ID from being used by multiple customers. When the determination is made (at 1620) that the VLANs have been previously assigned to the customer, the process 1600 identifies (at 1635) those public and private VLANs of the customer. The process 1600 then deploys (at 1640) the virtual server based on the grid ID and the public and private VLANs. For example, the private VLAN identity and the grid ID can be used to define a separate broadcast domain or private network such that the customer's servers can communicate with one another.

Figure 17:
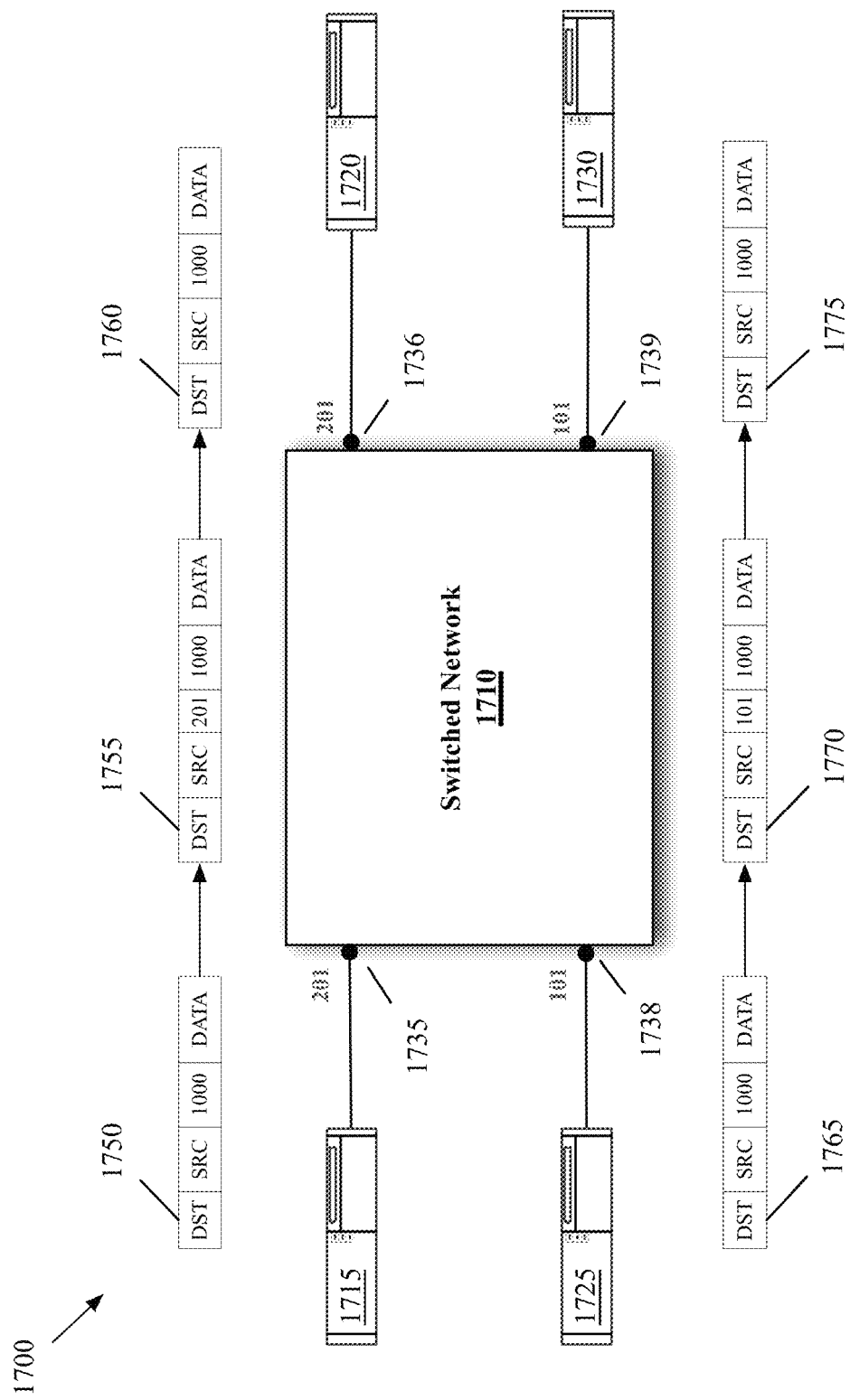
FIG. 17 conceptually illustrates a conversion process as frames move from one hardware node to another hardware node inside a single switched network of some embodiments.

FIG. 17 conceptually illustrates the conversion process as frames move from one hardware node to another hardware node inside a single switched network. Specifically, this figure shows that the hosting system 1700 inserts an outer grid tag into a frame when the frame enters a switched network and removes the grid tag when the frame exits the network. As illustrated in FIG. 17, the hosting system 1700 includes a switched network 1710 and four hardware nodes 1715-1730.

The switched network 1710 represents a set of switches that manage data communication of all virtual grids inside of the hosting system 1700. This set of switches may include one or more core switches and several top-of-rack switches. Hardware nodes 1715-1730 are computers that provide hardware resources (e.g., memory, storage, CPU, etc.) to be shared by customers. These hardware nodes connect to the switched network 1710 to communicate with other entities in the hosting system 1700.

A hardware node connects to the switched network 1710 through a particular port on a switch. How the hosting system 1700 configures that particular port will determine which grid the hardware node belongs to. In the example illustrated in FIG. 17, for instance, since hardware node 1715 connects to the switched network 1710 through a tunnel port 1735 that is configured for grid 201, hardware node 1715 can only provide hardware resources to VLANs in grid 201. Similarly, hardware node 1720 belongs to grid 201, while hardware nodes 1725 and 1730 belong to grid 101.

When a frame 1750 from hardware node 1715 enters into the switched network 1710 through the tunnel port 1735, the hosting system 1700 inserts a grid ID 201 into the frame as an outer tag. As a result, the altered frame 1755 will have two VLAN tags. One is the newly inserted grid ID. The other is an existing inner customer VLAN ID 1000. When the altered frame 1755 exits the switched network 1710 through a tunnel port 1736, the outer grid ID will be removed and the resulting frame 1760 will return to its original form with only the customer VLAN ID.

Similarly, the hosting system 1700 will insert a grid ID 101 into a frame 1765 when it enters the switched network 1710 through a tunnel port 1738, resulting in an altered frame 1770. The hosting system 1700 will remove the grid ID 101 from the altered frame 1770 when it exits the switched network 1710, resulting in frame 1775 that has a single VLAN tag that identifies the customer.

Figure 18:
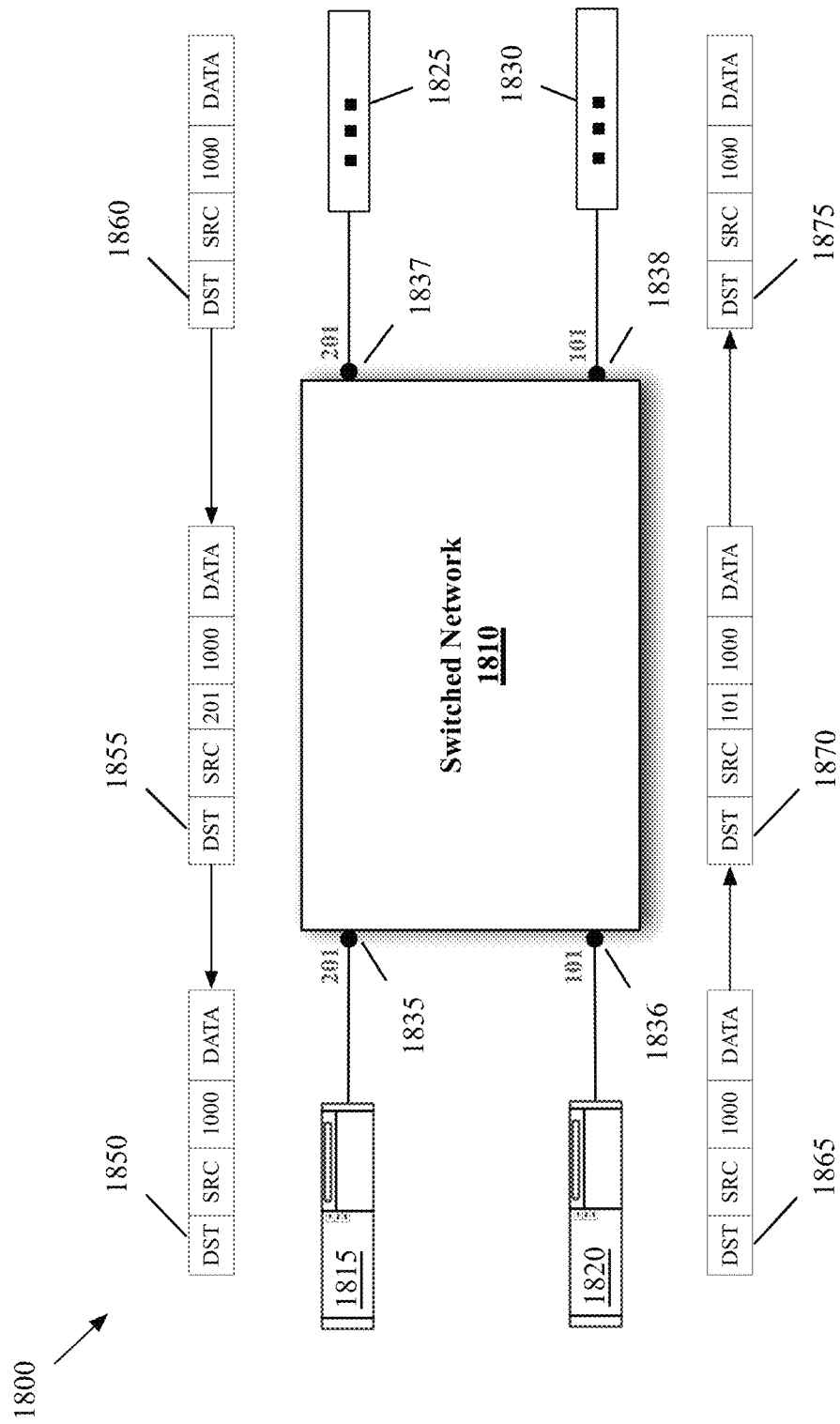
FIG. 18 conceptually illustrates a conversion process as frames move from a hardware node to a router inside a single switched network of some embodiments.

FIG. 18 conceptually illustrates the conversion process as frames move between a hardware node and a router inside a single switched network. Specifically, this figure shows that the hosting system 1800 inserts an outer grid tag into a frame when the frame enters a switched network and removes the grid tag when the frame exits the network. As illustrated in FIG. 18, the hosting system 1800 includes a switched network 1810, two hardware nodes 1815 and 1820, and two routers 1825 and 1830.

The switched network 1810 represents a set of switches that manage data communication for all virtual grids inside of the hosting system 1800. This set of switches may include one or more core switches and several top-of-rack switches. Hardware nodes 1815 and 1820 are computers that provide hardware resources (e.g., memory, storage, CPU, etc.) to be shared by customers. These hardware nodes connect to the switched network 1810 so that they can communicate with other entities in the hosting system 1800. The routers 1825 and 1830 are for routing traffic to the Internet.

A hardware node connects to the switched network 1810 through a particular port on a switch. How the hosting system 1800 configures that particular port will determine which grid a hardware node belongs to. In the example illustrated in FIG. 18, for instance, since hardware node 1815 connects to the switched network 1810 through a tunnel port 1835 that is configured for grid 201, hardware node 1815 can only provide hardware resources to VLANs in grid 201. Similarly, hardware node 1820 belongs to grid 101. A router can connect to multiple grids. However, in this example, router 1825 connects only to grid 201 and router 1830 connects only to grid 101.

When a frame 1860 from router 1825 enters into the switched network 1810 through the tunnel port 1837, the hosting system 1800 inserts a grid ID 201 into the frame as an outer tag. As a result, the altered frame 1855 will have two VLAN tags. One is the newly inserted grid ID 201. The other is an existing inner customer VLAN ID 1000. When the altered frame 1855 exits the switched network 1810 through a tunnel port 1835, the outer grid ID 201 will be removed. The frame 1850 reaching the hardware node 1815 will return to its original form with only the customer VLAN ID 1000.

Similarly, the hosting system 1800 will insert a grid ID 101 into a frame 1865 from the hardware node 1820 when it enters the switched network 1810 through a tunnel port 1836, resulting in an altered frame 1870. The hosting system 1800 will remove the grid ID 101 from the altered frame 1870 when it exits the switched network 1810, resulting in frame 1875 that has only one VLAN tag that identifies customer VLAN 1000. The frame 1875 will then go on to router 1830.

Figure 19:
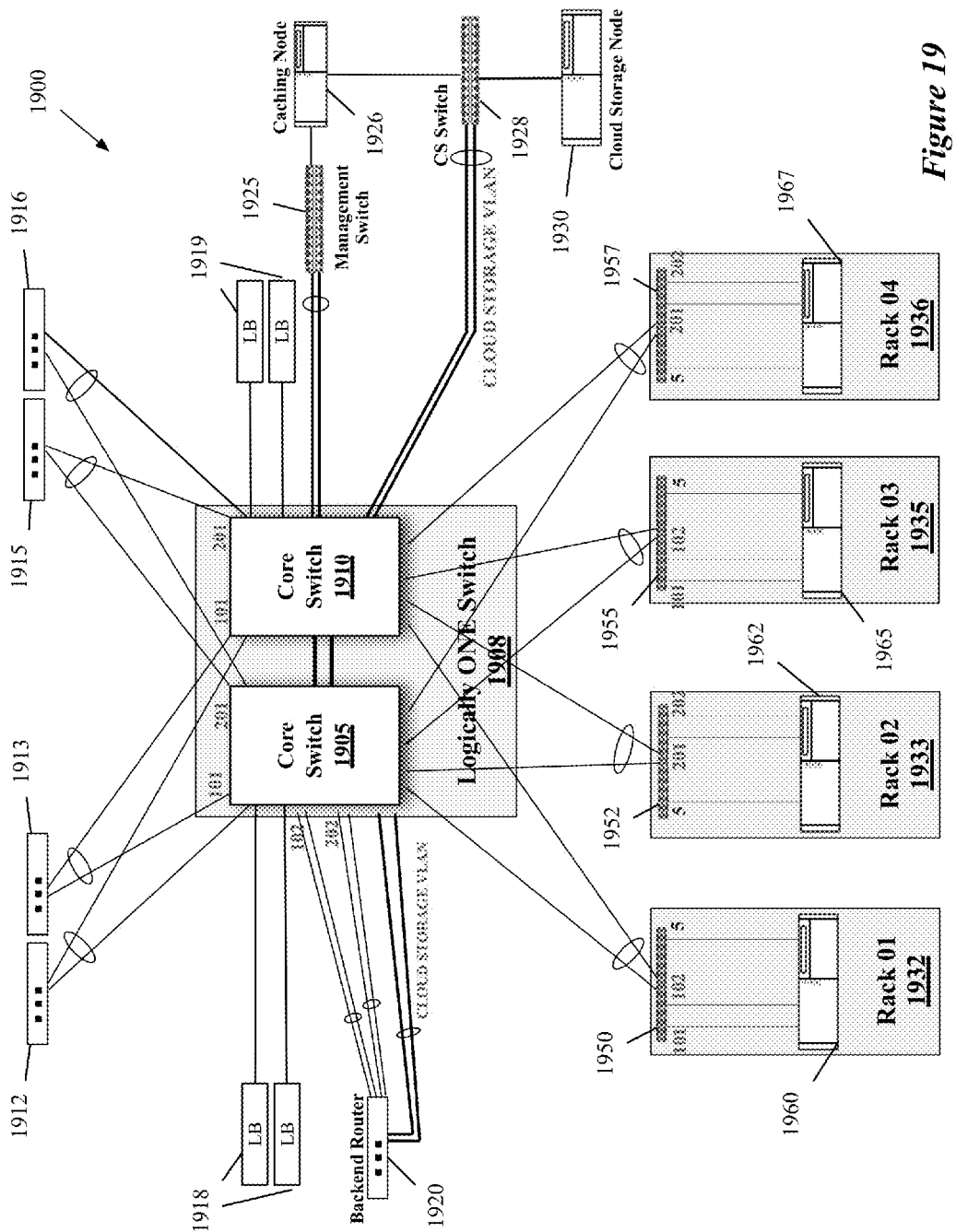
FIG. 19 illustrates a virtual grid hosting system of some embodiments with other supportive features.

FIG. 19 illustrates an example hosting system 1900 that combines the concept of virtual grids with some other features. Specifically, this figure illustrates that the hosting system 1900 leverages the same switching infrastructure for public networks, private networks, and management a network. This figure also illustrates that the hosting system 1900 uses core redundancy technologies to cluster two distinct physical switches into a single logical switch. As illustrated in FIG. 19, the hosting system 1900 includes two core switches 1905 and 1910, several routers 1912-1916, several load balancers 1918 and 1919, a backend router 1920, a management switch 1925, a caching node 1926, a cloud storage switch 1928, a cloud storage node 1930, and several hardware racks 1932-1936, each of which has a top-of-rack switch, e.g., 1950, and a hardware node, e.g., 1960.

The core switches 1905 and 1910 manage data communication for all virtual grids. The virtual grid network architecture significantly simplifies the configuration on the core switches. Instead of managing 4K customer VLANs, only the number of virtual grids needs to be managed by the core switches. This greatly reduces the load on the core switches 1905 and 1910, which can now be used for simply switching high volumes of traffic with minimal latency.

Core redundancy technologies enable clustering the two distinct physical switches 1905 and 1910 into a single logical switch 1908. All devices that connect to the core switches 1905 and 1910 will connect as if they are connecting to a single switch 1908. This will reduce the likelihood of physical loops in network connections. Core redundancy will also simplify management of the hosting system 1900. One IP address and configuration file controls both core switches 1905 and 1910. The control plane is active on one switch only, while the other switch is in non-controlling standby mode. However, the data-plane is active on both switches.

Routers 1912-1916 connect to the logical core switch 1908 to route traffic to the Internet. Load balancers 1918 and 1919 connect to the logical core switch 1908 to provide a single service from multiple servers. The cloud storage switch 1928 connects and switches data between the cloud storage node 1930, the caching node 1926, and the logical core switch 1908. The set of hardware racks 1932-1936 are standardized enclosures for mounting multiple hardware resources. Each hardware rack could contain several hardware nodes and one or more top-of-rack switch. For instance, hardware rack 1932 contains one hardware node 1960 and one top-of-rack switch 1950. The top-of-rack switch 1950 is an inexpensive switch that sits on the very top or near the top of a rack in a data center. The top-of-rack switch 1950 switches data for hardware node 1960.

The same switching infrastructure can be leveraged for the private networks by tunneling the private network traffic of a particular grid into its own outer grid ID. For example, private network traffic from grid 1 can be assigned an outer grid ID 102 and the private network traffic from grid 2 can be assigned an outer grid ID 202. A separate backend router 1920 is for routing the traffic between private networks and the cloud storage environment.

The management switch 1925 can serve multiple grids in switching data for the management network. The management network is for the hosting service providers to manage hardware nodes, e.g., adding a VLAN, removing a VLAN, loading a virtual server, etc.

The hosting system 1900 allows scaling of routing by addition of routers or interfaces on existing routers 1912-1916 as the number of customers increases. Private network routing can be scaled similarly. The hosting system 1900 can scale management switch 1925 by stacking additional switches. Similarly, the hosting system 1900 can scale cloud storage switch 1928 by stacking additional switches.

As long as individual non-core components in the hosting system 1900 are sized appropriately, there should be no performance issues. The core switches 1905 and 1910 will be lightly configured with a few VLANs and minimal routing configuration. Their control plane is not likely to be loaded at all. The core switches 1905 and 1910 should be able to provide ample data forwarding capacity.

In the hosting system 1900, it is easy to provide redundancy with almost all network components. The only single point of failure is the top-of-rack switches 1950-1957. Any failure of top-of-rack switches will likely be isolated to a small set of customers. For instance, the failure of top-of-rack switch 1950 will only affect customers using the hardware node 1960.

The upfront cost of deploying the hosting system 1900 is likely to be high. However, incremental costs will be low. It will be much cheaper to deploy additional grids as compared to deploying whole new physical grids as described in FIG. 12. The hosting system 1900 can leverage the same routers for multiple grids. There is no need to deploy two routers per grid for redundancy. One router can serve as a backup for all the other routers.

As the separation of grids is virtual instead of physical, moving unused resources such as hardware nodes, load balancers, etc., can be done by simply changing the VLAN ID of the tunnel port on the switch. The devices do not need to be physically moved.

IV. Grid-Independent Nodes

Figure 20:
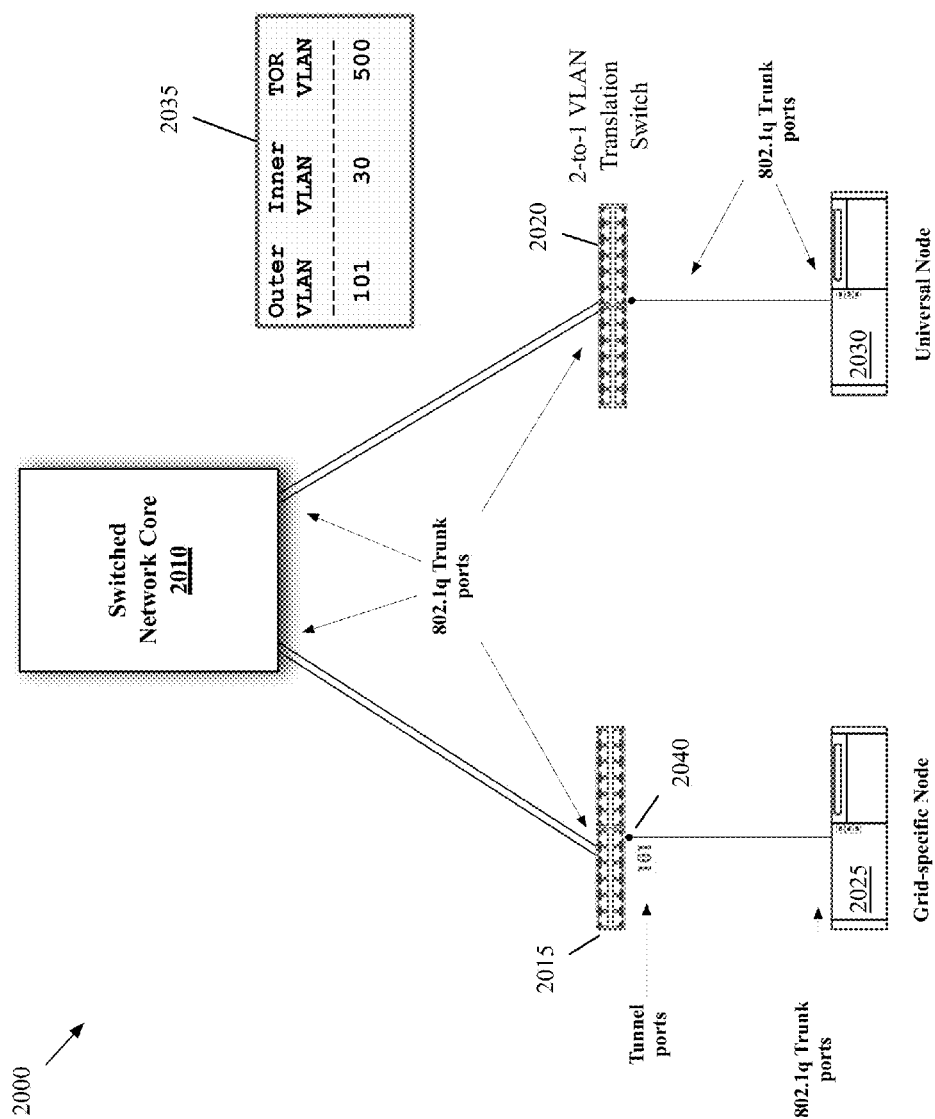
FIG. 20 illustrates an example network architecture for providing grid-independent hardware nodes in a switching infrastructure.

FIG. 20 illustrates an example network architecture for providing grid-independent hardware nodes in a switching infrastructure. Grid-independent nodes allow deployment of any customer from any grid on a particular hardware node. Specifically, this figure shows how grid-specific nodes and grid-independent (or universal) nodes can co-exist in the same switched network. As illustrated in FIG. 20, a hosting system 2000 includes a switched network core 2010, a regular top-of-rack switch 2015, a two-to-one VLAN translation switch 2020, a grid-specific hardware node 2025, and a grid-independent node 2030.

The switched network core 2010 is a set of core switches that manage data communication for all virtual grids. The top-of-rack switch 2015 is an inexpensive switch connecting the hardware node 2025 to the rest of the switched network. The hardware node 2025 is a grid-specific node, which means it is tied to a particular virtual grid, e.g., grid 101. The hosting system 2000 configures the port 2040 as a tunnel port that inserts an outer grid ID 101 into frames coming from the hardware node 2025 and removes the outer grid ID from frames leaving for the node. As a result, the hardware node 2025 can only provide its hardware resources to customers in grid 101.

The two-to-one VLAN translation switch 2020 makes the hardware node 2030 grid-independent. As shown in FIG. 20, the hardware node 2030 connects to the switch 2020 through a 802.1Q trunk port rather than a 802.1QinQ tunnel port. This means that any frame to and from the hardware node 2030 will have only one inner VLAN tag. Since frames arriving at the switch 2020 from other parts of the switched network have two VLAN tags, the switch 2020 has to do a two-to-one mapping to enable the two sides to communicate with each other. In the two-to-one mapping table 2035 in FIG. 20, a customer from grid 101 with a customer VLAN ID 30 is mapped to a local VLAN ID 500. Likewise, a customer from hardware node 2030 with only a local VLAN ID 500 is mapped to grid ID 101 and customer VLAN ID 30. As a result of this mapping, the hardware node 2030 can be leveraged to serve customers in multiple grids. This enables hardware resource sharing between multiple grids and makes the hosting system 2000 more cost effective.

Figure 21:
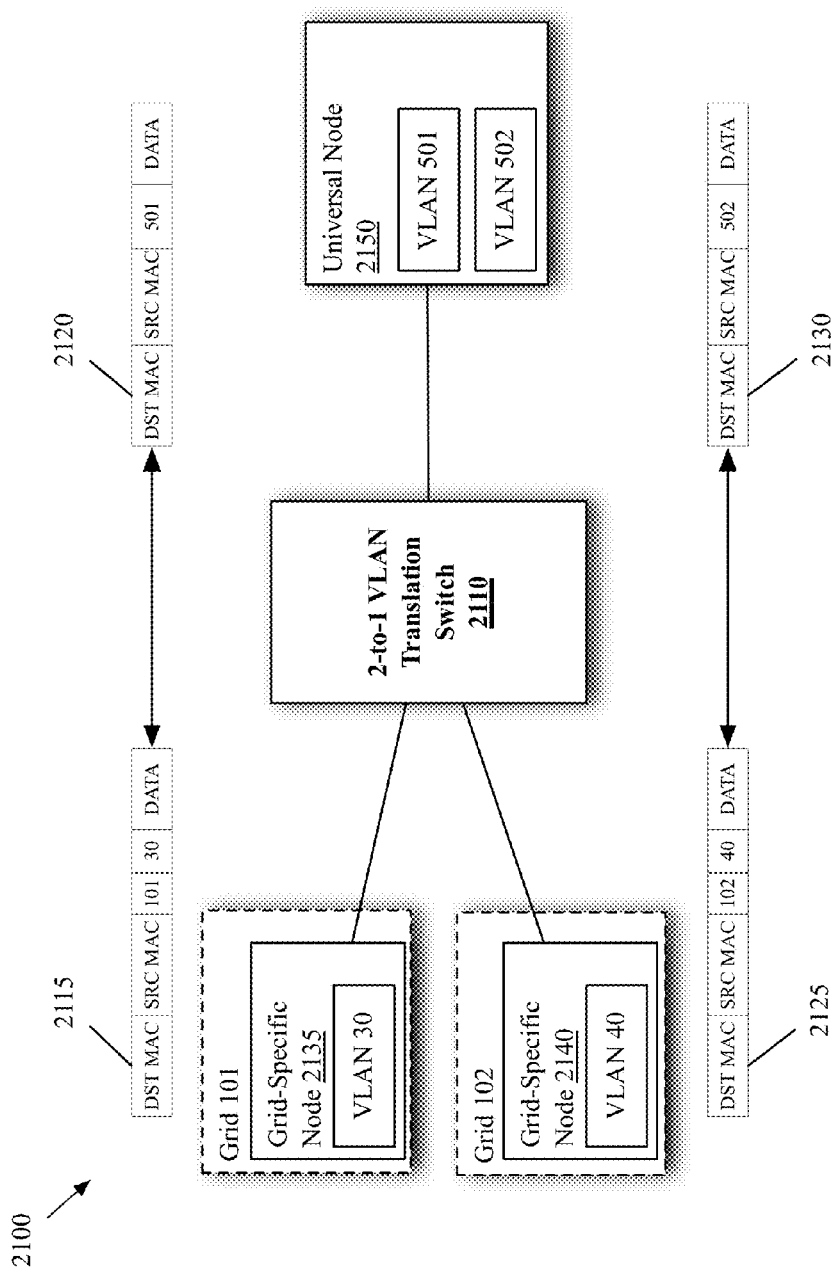
FIG. 21 illustrates a single hardware node of some embodiments that is shared by customers from different grids.

FIG. 21 illustrates how customers from different grids can share the same hardware node. Specifically, this figure shows how frames from different grids can be mapped to the same hardware node by a two-to-one VLAN translation switch. As illustrated in FIG. 21, an example hosting system 2100 includes a two-to-one VLAN translation switch 2110, a grid-specific hardware node 2135 of grid 101, a grid-specific hardware node 2140 of grid 102, and a grid-independent (universal) hardware node 2150.

Every frame coming in to and out of node 2135, e.g., 2115, has an outer grid ID 101 and inner customer VLAN ID. For frame 2115, the inner VLAN ID is 30 because it originated from or is destined for customer VLAN 30 on node 2135. When switch 2110 receives frame 2115, it will map the outer grid ID 101 and inner VLAN ID 30 to a single VLAN ID 501, resulting frame 2120. The converted frame 2120 will then reach local VLAN 501 on the grid-independent node 2150. Similarly, frame 2120 from node 2150 will be converted to frame 2115 when it goes through switch 2110 and reaches node 2135.

On the other side in grid 102, a frame, e.g., 2125, that originated from VLAN 40 on node 2140 of grid 102 is converted to frame 2130 when going through switch 2110, where the outer grid ID 102 and inner customer VLAN ID 40 is mapped to a local VLAN ID 502. Similarly, frame 2130 will be converted to frame 2125 when it goes from hardware node 2150 to node 2140 through switch 2110. As a result of these conversions, customers from grid 101 and grid 102 can share the resources on the same hardware node 2150.

In some cases, a customer may have different accounts with the same hosting service provider for a number of reasons, e.g., account segregation, security, billing, access control, etc. Those different accounts may wind up being associated with two different grids. But the customer may still want deployments for those separate accounts to use the same physical hardware resources for better performance, less latency, or other reasons. The method illustrated in FIG. 21 makes it possible for a customer's multiple accounts on different grids to share resources on the same hardware node.

Figure 22:
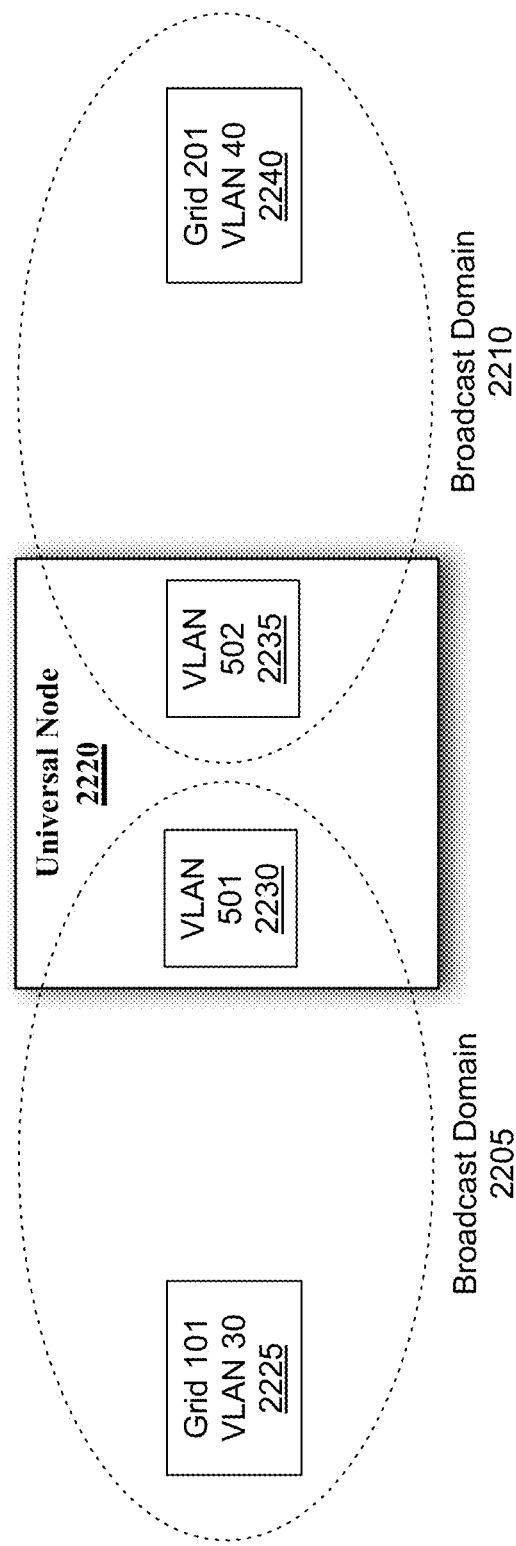
FIG. 22 conceptually illustrates two broadcast domains sharing the same hardware node of some embodiments.

FIG. 22 conceptually illustrates two broadcast domains 2205 and 2210 created by two-to-one VLAN translation sharing the same hardware node. Specifically, the servers 2225 and 2230 are on one broadcast domain 2205, while the servers 2240 and 2235 are on a separate broadcast domain 2210. The broadcast domain 2205 is in grid 101 and the broadcast domain 2210 is in grid 201, yet they share hardware resources by having servers on the same hardware node 2220.

In some embodiments, a two-to-one VLAN translation switch is configured to translate VLAN ID tags in headers (e.g., 802.1Q headers and 802.1QinQ headers) of all frames of data going between the switch and any upstream switches. For instance, the two-to-one VLAN translation may be done at the switch's port level. That is, the switch may not be aware of a virtual server's grid ID and customer VLAN ID prior to the translation. However, when the switch identifies data (e.g., frame of data) going to a particular MAC address (e.g., of the virtual server), the switch may replace the local VLAN ID in the header with the virtual server's grid ID and customer VLAN ID.

Figure 23:
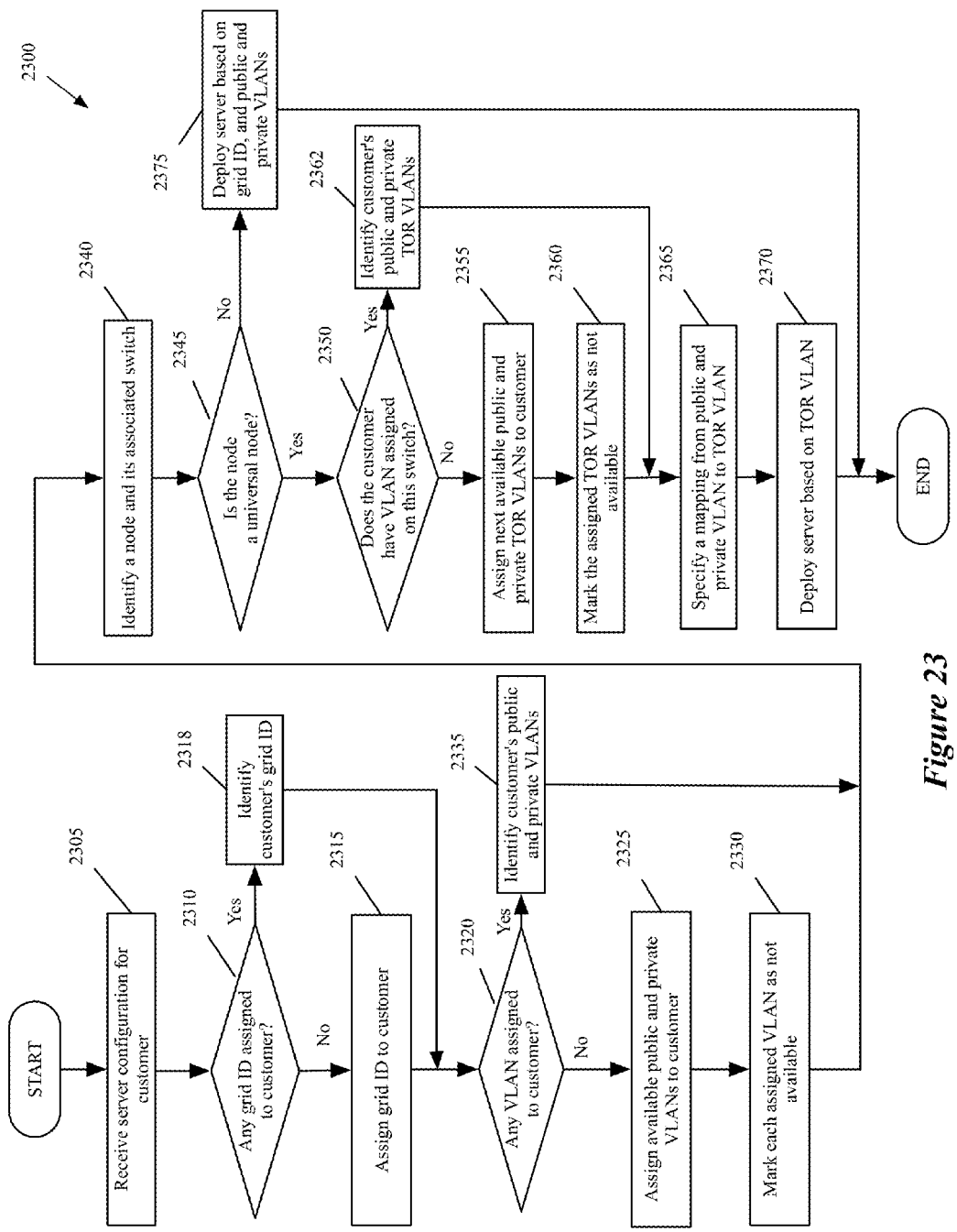
FIG. 23 conceptually illustrates a process for provisioning a virtual server on a grid-independent hardware node.

For a hosting system, FIG. 23 conceptually illustrates a process 2300 for provisioning a virtual server on a hardware node. Different from the process 1600 of FIG. 16, the process 2300 facilitates deployment of the virtual server by specifying a mapping of the public and private VLANs to VLANs of a particular switch. In some embodiments, the process 2300 is performed by one or more components of the hosting system (e.g., the core, the resource management system, the deployment manager).

As shown in FIG. 23, operations 2305 to 2330 are identical to operations 1605-1630 of FIG. 16. Specifically, the process 2300 first receives (at 2305) a server configuration for a customer. The process then determines (at 2310) whether there is a grid ID assigned to the customer. When there is no grid assigned to the customer, the process assigns (at 2315) a grid ID to the customer. When the customer has been previously assigned a grid ID, the process identifies (at 2318) this grid ID.

The process 2300 then determines (at 2320) whether there is any VLANs assigned to the customer. When there is no VLANs assigned to the customer, the process 2300 assigns (at 2325) available VLANs for the server's public and private networks. The process then marks (at 2330) each assigned VLAN as not available. When there are VLANs previously assigned to the customer, the process identifies (at 2335) the customer's public and private VLANs.

As shown in FIG. 23, the process then identifies (at 2340) a hardware node to deploy the virtual server. Here, the process 2300 also identifies the hardware node's switch. The process 2300 then determines (at 2345) whether the hardware node is a grid-specific node or a grid-independent (universal) node. In some embodiment, the process 2300 makes this determination by querying one or more databases (e.g., the asset database).

When the process 2300 determines (at 2345) that the hardware node is a grid-specific node, the process then deploys (at 2375) the virtual server based on the grid ID and the public and private VLANs. For example, the private VLAN identity and the grid ID can be used to define a separate broadcast domain or private network such that the customer's servers can communicate with one another.

When the node is a grid-independent node, the process 2300 determines (at 2350) whether one or more switch VLANs (e.g., TOR VLANs) has been assigned to the customer. In some embodiments, the process 2300 determines whether the customer has been assigned public and private VLANs on the switch that was identified at 2340.

When the determination is made that the switch VLANs has not been assigned, the process 2300 assigns (at 2355) available public and private switch VLANs to the customer. The process then marks (at 2360) each assigned switch VLAN as not available. This prevents the same TOR VLANs from being assigned to a different customer. In some embodiments, the process 2300 performs the marking by modifying data in the customer database and/or the asset database.

When the determination is made that the switch VLANs has been assigned, the process 2300 identifies (at 2362) the customer's public and private switch VLANs. At 2365, the process specifies a mapping from the public and private VLANs to the TOR VLAN. In some embodiments, the grid identity is also used to perform a two-to-one mapping as described above by reference to FIG. 20. Finally, the process 2300 deploys (at 2370) and configures the network details of the virtual server by using the public and private switch VLANs.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
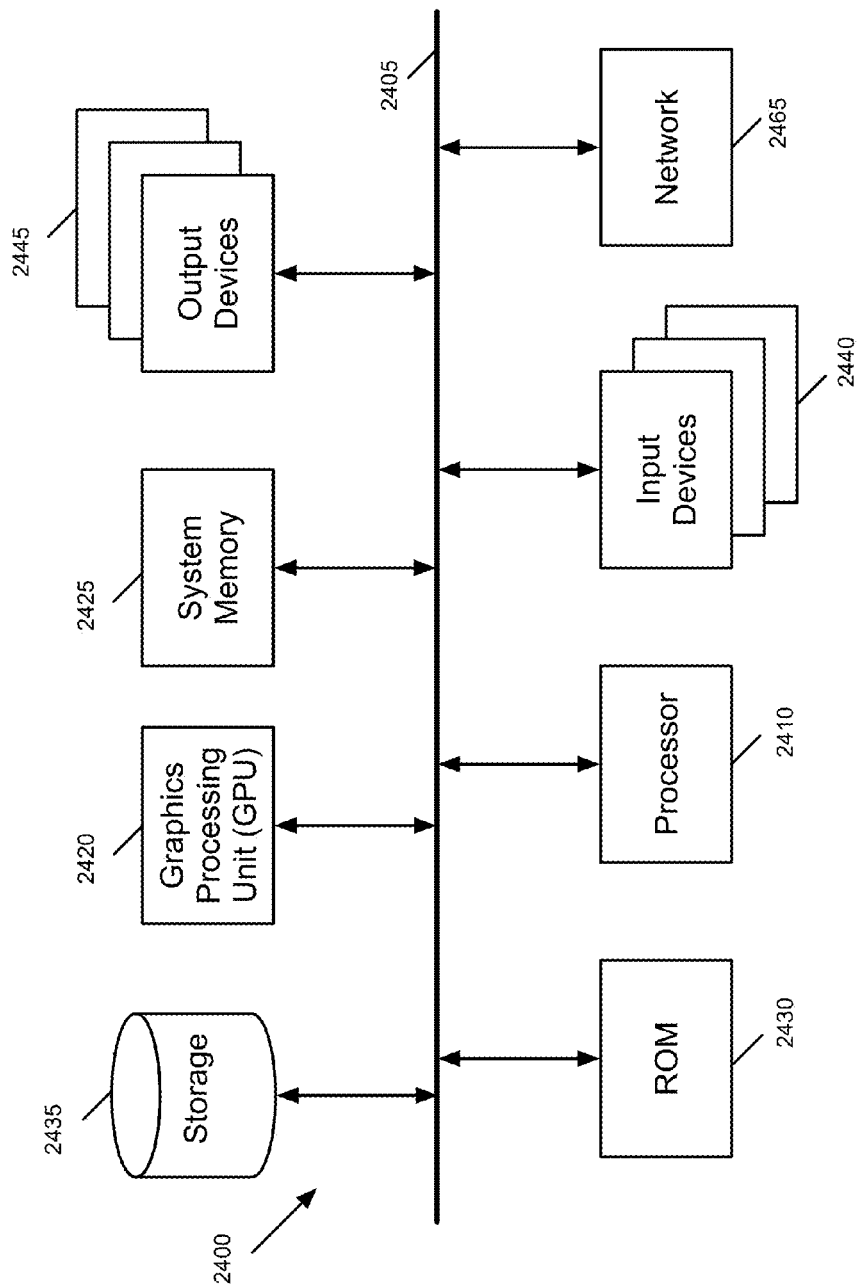
FIG. 24 conceptually illustrates an electronic system with which some embodiments of the invention are implemented.

FIG. 24 conceptually illustrates an electronic system 2400 with which some embodiments of the invention are implemented. The electronic system 2400 may be a computer (e.g., a desktop computer, personal computer, tablet computer, etc.), phone (e.g., smart phone), PDA, or any other sort of electronic device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, or ZIP® disk, and its corresponding disk drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"). The output devices 2445 display images generated by the electronic system. The output devices 2445 include printers and display devices, such as cathode ray tubes (CRT) or liquid crystal displays (LCD). Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 16 and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of deploying a set of virtual servers on one or more hardware nodes, the method comprising:
    receiving a configuration for a set of virtual servers from a particular entity;
    identifying a grid identity assigned to the particular entity;
    specifying a private virtual local area network (VLAN) identity assigned to the particular entity by (i) determining whether a private VLAN identity has been assigned to the particular entity, and (ii) assigning a new private VLAN identity when a private VLAN identity has not been assigned to the particular entity;
    specifying a public VLAN identity assigned to the particular entity by (i) determining whether a public VLAN identity has been assigned to the particular entity, and (ii) assigning a new public VLAN identity when a public VLAN identity has not been assigned to the particular entity; and
    deploying the set of virtual servers on one or more of the hardware nodes,
        wherein a separate broadcast domain is defined for the particular entity's set of virtual servers using the grid identity and the private VLAN identity, and
        wherein a public network, which provides public Internet access to one or more of the set of virtual servers, is defined for the set of virtual servers using the grid identity and the public VLAN identity,
        wherein the public and private VLAN identities are defined by a VLAN protocol that limits the number of available VLANs for different entities, wherein the grid identity is used to extend the number of available VLANs,
        wherein the VLAN protocol is a first protocol, the method further comprising utilizing a second different protocol to extend the number of available VLANs beyond the limitations of the first protocol.

2. The method of claim 1, wherein the particular entity is a user or a customer.

3. The method of claim 1, wherein the set of virtual servers includes more than one virtual server, wherein the second protocol is an 802.1QinQ protocol, wherein the grid identity is used as an outer VLAN tag and the private VLAN identity is used as an inner VLAN tag in order exchange data between the particular entity's first virtual server and the particular entity's second virtual server.

4. The method of claim 1, wherein the separate broadcast domain allows only the virtual servers of the particular entity to communicate with one another.

5. The method of claim 1, wherein the configuration specifies at least one of an operating system, storage size, amount of memory, processor type, and location of datacenter for a particular virtual server.

6. A non-transitory computer readable medium storing a computer program that when executed by at least one processor facilitates deployment of a virtual server on a hardware node, wherein the computer program comprises sets of instructions for:
- receiving a configuration for a set of virtual servers from a particular customer;
- identifying a grid identity assigned to the particular customer;
- specifying a private virtual local area network (VLAN) identity assigned to the particular customer by (i) determining whether a private VLAN identity has been assigned to the particular customer and (ii) assigning a new private VLAN identity when a private VLAN identity has not been assigned to the particular customer;
- specifying a public VLAN identity assigned to the particular customer by (i) determining whether a public VLAN identity has been assigned to the particular customer and (ii) assigning a new public VLAN identity when a public VLAN identity has not been assigned to the particular customer; and
- facilitating an automatic deployment of the set of virtual servers on one or more of the hardware nodes,
  - wherein a separate broadcast domain is defined for the particular customer's set of virtual servers using the grid identity and the private VLAN identity, and
  - wherein a public network, which provides public Internet access to one or more of the set of virtual servers, is defined for the set of virtual servers using the grid identity and the public VLAN identity,
  - wherein the public and private VLAN identities are defined by a VLAN protocol that limits the number of available VLANs for different entities, wherein the grid identity is used to extend the number of available VLANs,
  - wherein the VLAN protocol is a first protocol, wherein the computer program further comprises a set of instructions for utilizing a second different protocol to extend the number of available VLANs beyond the limitations of the first protocol.

7. The non-transitory computer readable medium of claim 6, wherein the set of instructions for identifying the grid identity comprises sets of instructions for (i) determining whether a grid identity has been assigned to the particular customer, and (ii) assigning the grid identity upon determining that a grid identity has not been assigned to the particular customer.

8. The non-transitory computer readable medium of claim 6, wherein the computer program further comprises a set of instructions for mapping the private and public VLAN identities to a VLAN on the hardware node's switch.

9. The non-transitory computer readable medium of claim 6, wherein the set of instructions for specifying the private or public VLAN identity comprises sets of instructions for determining whether the corresponding VLAN identity has been assigned on the hardware node's switch.

10. The non-transitory computer readable medium of claim 9, wherein the computer program further comprises a set of instructions for marking the private or public VLAN identity as a VLAN identity that is not available for the hardware node's switch.

11. A hosting system comprising:
- a first set of front-end computing devices, including a processor and memory that execute a first set of modules for:
  - receiving a configuration for a set of virtual servers from a particular customer;
  - identifying a grid identity assigned to the particular customer;
  - specifying a private virtual local area network (VLAN) identity assigned to the particular customer by (i) determining whether a private VLAN identity has been assigned to the particular customer, and (ii) assigning a new private VLAN identity when a private VLAN identity has not been assigned to the particular customer;
  - specifying a public VLAN identity assigned to the particular customer by (i) determining whether a public VLAN identity has been assigned to the particular customer, and (ii) assigning a new public VLAN identity when a public VLAN identity has not been assigned to the particular customer;
- a second set of back-end computing devices that execute a second set of modules for deploying the set of virtual servers on one or more of the hardware nodes,
  - wherein a separate broadcast domain is defined for the particular customer's set of virtual servers using the grid identity and the private VLAN identity, and
  - wherein a public network, which provides public Internet access to one or more of the set of virtual servers, is defined for the set of virtual servers using the grid identity and the public VLAN identity,
  - wherein the public and private VLAN identities are defined by a VLAN protocol that limits the number of available VLANs for different entities, wherein the grid identity is used to extend the number of available VLANs,
  - wherein the VLAN protocol is a first protocol, wherein the system utilizes a second different protocol to extend the number of available VLANs beyond the limitations of the first protocol.

12. The hosting system of claim 11 further comprising a data store for storing customer data, wherein identifying the grid identity comprises (i) accessing the data store to determine whether a grid identity has been assigned to the particular customer, and (ii) assigning the grid identity upon determining that a grid identity has not been assigned to the particular customer.

13. The hosting system of claim 11 further comprising a data store for storing customer data, wherein identifying the private VLAN identity comprises (i) accessing the data store to determine whether a private VLAN identity has been assigned to the particular customer, and (ii) assigning a new VLAN identity upon determining that a private VLAN identity has not been assigned to the particular customer.

14. The hosting system of claim 11, wherein the second set of modules comprises a deployment manager, wherein the first set of modules is further for facilitating the deployment of the set of virtual servers by formulating a message based on the received configuration and the grid and the VLAN identities, and sending the message to the deployment manager.

15. The non-transitory computer readable medium of claim 6,
wherein the computer program further comprises sets of instructions for:
- assigning a particular VLAN identity that is available on a switch; and
- specifying a mapping of the grid identity and the public VLAN identity to the particular VLAN identity.

* * * * *